United States Patent [19]
Kohiyama et al.

[11] Patent Number: 5,666,161
[45] Date of Patent: Sep. 9, 1997

[54] METHOD AND APPARATUS FOR CREATING LESS AMOUNT OF COMPRESSD IMAGE DATA FROM COMPRESSED STILL IMAGE DATA AND SYSTEM FOR TRANSMITTING COMPRESSED IMAGE DATA THROUGH TRANSMISSION LINE

[75] Inventors: Tomohisa Kohiyama; Junji Nakata; Takeo Tomokane, all of Yokohama; Tetsuya Kawahara, Fujisawa; Masami Yamagishi, Zama; Taminori Tomita, Chigasaki; Takahiro Yamada, Yokohama; Munekazu Kamo, Hadano, all of Japan

[73] Assignee: Hitachi, Ltd., Tokyo, Japan

[21] Appl. No.: 233,702

[22] Filed: Apr. 26, 1994

[30] Foreign Application Priority Data

Apr. 26, 1993 [JP] Japan .................... 5-099771
Jul. 14, 1993 [JP] Japan .................... 5-173971

[51] Int. Cl.$^6$ .................................................. H04N 7/30
[52] U.S. Cl. ........................ 348/408; 358/403; 358/439
[58] Field of Search ........................... 358/403, 261.3, 358/432, 433, 439; 348/400, 405, 408; H04N 7/133

[56] References Cited

U.S. PATENT DOCUMENTS 4,734,767  3/1988  Kaneko ........................ 348/400
5,073,821  12/1991 Juri ............................ 348/405
5,272,543  12/1993 Yanagisawa ................... 358/403
5,416,602  5/1995  Inga ........................... 348/403

FOREIGN PATENT DOCUMENTS

A29271   1/1990  Japan .
A670174  3/1994  Japan .

*Primary Examiner*—Howard W. Britton
*Attorney, Agent, or Firm*—Antonelli, Terry, Stout & Kraus, LLP

[57] ABSTRACT

Compressed image data of a desired picture is read out from a memory having compressed image data of a sequential format stored therein and then subjected to an examination with respect to a plurality of frequency components of the read-out compressed image data. Part of the plurality of frequency components is deleted to obtain compressed image data of a quality lower than an original quality of the compressed image data. The obtained compressed image data of the lower quality is decoded and displayed on a display. The plurality of frequency components are deleted in a stepwise manner according to a traffic state of a transmission line through which the compressed image data is to be transmitted. For maintaining a picture frame rate to be constant, the plurality of frequency components may be deleted in a stepwise manner. For obtaining a desired decoding rate, the plurality of frequency components may be deleted in a stepwise manner.

8 Claims, 22 Drawing Sheets

HIGH EFFICIENT CODING SYSTEM
(PICTURE COMPRESSION SYSTEM)

HIGH EFFICIENT DECODING SYSTEM (PICTURE EXPANDING SYSTEM)

SEQUENTIAL SYSTEM

: TRANSMISSION DATA

SEQUENTIAL

PROGRESSIVE SYSTEM

PROGRESSIVE

| TERMINAL 201 | SLOTS 1,5 | 2/8×4Mbps | =1Mbps |
| TERMINAL 202 | SLOTS 2,6 | 2/8×4Mbps | =1Mbps |
| TERMINAL 203 | SLOTS 3,7 | 2/8×4Mbps | =1Mbps |
| CONTROLLER 205 | SLOTS 4,8 | 2/8×4Mbps | =1Mbps |

WHEN TIME SLOTS ARE EQUALLY ASSIGNED

| TERMINAL 201 | SLOTS 1,3,5,7 | 4/8×4Mbps | =2Mbps |
| TERMINAL 202 | SLOTS 2 | 1/8×4Mbps | =0.5Mbps |
| TERMINAL 203 | SLOTS 6 | 1/8×4Mbps | =0.5Mbps |
| CONTROLLER 205 | SLOTS 4,8 | 2/8×4Mbps | =1Mbps |

WHEN TERMINAL 201 IS WEIGHTED

INPUT COEFFICIENT EXAMPLE

INFORMATION EXAMPLE OF FREQUENCY COMPONENTS TO BE DELETED

INPUT COEFFICIENT EXAMPLE

COEFFICIENT SCANNING SEQUENCE

OUTPUT CODE STREAM  11010000  100101  100000  1010
CODES FOR COEFFICIENT "16"
CODES INDICATIVE OF END OF CODES
CODES FOR COEFFICIENT "7"
CODES FOR COEFFICIENT "5"

FIG.13

| GROUP NUMBER | CODE LENGTH | CODE WORD |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

FIG. 14A

| RUN LENGTH/GROUP NUMBER | CODE LENGTH | CODE WORD | RUN LENGTH/GROUP NUMBER | CODE LENGTH | CODE WORD | RUN LENGTH/GROUP NUMBER | CODE LENGTH | CODE WORD |
|---|---|---|---|---|---|---|---|---|
| 0/0 (EOB) | 4 | 1010 | 5/4 | 16 | 1111111110011111 | A/B | 16 | 1111111111001101 |
| 0/1 | 2 | 00 | 5/5 | 16 | 1111111110100000 | A/9 | 16 | 1111111111001110 |
| 0/2 | 2 | 01 | 5/6 | 16 | 1111111110100001 | A/A | 16 | 1111111111001111 |
| 0/3 | 3 | 100 | 5/7 | 16 | 1111111110100010 | B/1 | 10 | 1111111001 |
| 0/4 | 4 | 1011 | 5/8 | 16 | 1111111110100011 | B/2 | 16 | 1111111111010000 |
| 0/5 | 5 | 11010 | 5/9 | 16 | 1111111110100100 | B/3 | 16 | 1111111111010001 |
| 0/6 | 7 | 1111000 | 5/A | 16 | 1111111110100101 | B/4 | 16 | 1111111111010010 |
| 0/7 | 8 | 11111000 | 6/1 | 7 | 1111011 | B/5 | 16 | 1111111111010011 |
| 0/8 | 10 | 1111110110 | 6/2 | 12 | 111111110110 | B/6 | 16 | 1111111111010100 |
| 0/9 | 16 | 1111111110000010 | 6/3 | 16 | 1111111110100110 | B/7 | 16 | 1111111111010101 |
| 0/A | 16 | 1111111110000011 | 6/4 | 16 | 1111111110100111 | B/8 | 16 | 1111111111010110 |
| 1/1 | 4 | 1100 | 6/5 | 16 | 1111111110101000 | B/9 | 16 | 1111111111010111 |
| 1/2 | 5 | 11011 | 6/6 | 16 | 1111111110101001 | B/A | 16 | 1111111111011000 |
| 1/3 | 7 | 1111001 | 6/7 | 16 | 1111111110101010 | C/1 | 10 | 1111111010 |
| 1/4 | 9 | 111110110 | 6/8 | 16 | 1111111110101011 | C/2 | 16 | 1111111111011001 |
| 1/5 | 11 | 11111110110 | 6/9 | 16 | 1111111110101100 | C/3 | 16 | 1111111111011010 |
| 1/6 | 16 | 1111111110000100 | 6/A | 16 | 1111111110101101 | C/4 | 16 | 1111111111011011 |
| 1/7 | 16 | 1111111110000101 | 7/1 | 8 | 11111010 | C/5 | 16 | 1111111111011100 |
| 1/8 | 16 | 1111111110000110 | 7/2 | 12 | 111111110111 | C/6 | 16 | 1111111111011101 |
| 1/9 | 16 | 1111111110000111 | 7/3 | 16 | 1111111110101110 | C/7 | 16 | 1111111111011110 |
| 1/A | 16 | 1111111110001000 | 7/4 | 16 | 1111111110101111 | C/8 | 16 | 1111111111011111 |
| 2/1 | 5 | 11100 | 7/5 | 16 | 1111111110110000 | C/9 | 16 | 1111111111100000 |
| 2/2 | 8 | 11111001 | 7/6 | 16 | 1111111110110001 | C/A | 16 | 1111111111100001 |
| 2/3 | 10 | 1111110100 | 7/7 | 16 | 1111111110110010 | C/1 | 11 | 11111111000 |
| 2/4 | 12 | 111111110100 | 7/8 | 16 | 1111111110110011 | C/2 | 16 | 1111111111100010 |
| 2/5 | 16 | 1111111110001001 | 7/9 | 16 | 1111111110110100 | C/3 | 16 | 1111111111100011 |

FIG. 14B

| RUN LENGTH/GROUP NUMBER | CODE LENGTH | CODE WORD | RUN LENGTH/GROUP NUMBER | CODE LENGTH | CODE WORD | RUN LENGTH/GROUP NUMBER | CODE LENGTH | CODE WORD |
|---|---|---|---|---|---|---|---|---|
| 2/6 | 16 | 1111111110001010 | 7/A | 16 | 1111111110110101 | C/4 | 16 | 1111111111100100 |
| 2/7 | 16 | 1111111110001011 | 8/1 | 9 | 111111000 | D/5 | 16 | 1111111111100101 |
| 2/8 | 16 | 1111111110001100 | 8/2 | 15 | 111111111000000 | D/6 | 16 | 1111111111100110 |
| 2/9 | 16 | 1111111110001101 | 8/3 | 16 | 1111111110110110 | D/7 | 16 | 1111111111100111 |
| 2/A | 16 | 1111111110001110 | 8/4 | 16 | 1111111110110111 | D/8 | 16 | 1111111111101000 |
| 3/1 | 6 | 111010 | 8/5 | 16 | 1111111110111000 | D/9 | 16 | 1111111111101001 |
| 3/2 | 9 | 111110111 | 8/6 | 16 | 1111111110111001 | D/A | 16 | 1111111111101010 |
| 3/3 | 12 | 111111110101 | 8/7 | 16 | 1111111110111010 | E/1 | 16 | 1111111111101011 |
| 3/4 | 16 | 1111111110001111 | 8/8 | 16 | 1111111110111011 | E/2 | 16 | 1111111111101100 |
| 3/5 | 16 | 1111111110010000 | 8/9 | 16 | 1111111110111100 | E/3 | 16 | 1111111111101101 |
| 3/6 | 16 | 1111111110010001 | 8/A | 16 | 1111111110111101 | E/4 | 16 | 1111111111101110 |
| 3/7 | 16 | 1111111110010010 | 9/1 | 9 | 111111001 | E/5 | 16 | 1111111111101111 |
| 3/8 | 16 | 1111111110010011 | 9/2 | 16 | 1111111110111110 | E/6 | 16 | 1111111111110000 |
| 3/9 | 16 | 1111111110010100 | 9/3 | 16 | 1111111110111111 | E/7 | 16 | 1111111111110001 |
| 3/A | 16 | 1111111110010101 | 9/4 | 16 | 1111111111000000 | E/8 | 16 | 1111111111110010 |
| 4/1 | 6 | 111011 | 9/5 | 16 | 1111111111000001 | E/9 | 16 | 1111111111110011 |
| 4/2 | 10 | 1111111000 | 9/6 | 16 | 1111111111000010 | E/A | 16 | 1111111111110100 |
| 4/3 | 16 | 1111111110010110 | 9/7 | 16 | 1111111111000011 | F/0(ZRL) | 11 | 11111111001 |
| 4/4 | 16 | 1111111110010111 | 9/8 | 16 | 1111111111000100 | F/1 | 16 | 1111111111110101 |
| 4/5 | 16 | 1111111110011000 | 9/9 | 16 | 1111111111000101 | F/2 | 16 | 1111111111110110 |
| 4/6 | 16 | 1111111110011001 | 9/A | 16 | 1111111111000110 | F/3 | 16 | 1111111111110111 |
| 4/7 | 16 | 1111111110011010 | A/1 | 9 | 111111010 | F/4 | 16 | 1111111111111000 |
| 4/8 | 16 | 1111111110011011 | A/2 | 16 | 1111111111000111 | F/5 | 16 | 1111111111111001 |
| 4/9 | 16 | 1111111110011100 | A/3 | 16 | 1111111111001000 | F/6 | 16 | 1111111111111010 |
| 4/A | 16 | 1111111110011101 | A/4 | 16 | 1111111111001001 | F/7 | 16 | 1111111111111011 |
| 5/1 | 7 | 1111010 | A/5 | 16 | 1111111111001010 | F/8 | 16 | 1111111111111100 |
| 5/2 | 11 | 11111110111 | A/6 | 16 | 1111111111001011 | F/9 | 16 | 1111111111111101 |
| 5/3 | 16 | 1111111110011110 | A/7 | 16 | 1111111111001100 | F/A | 16 | 1111111111111110 |

FIG. 16A  INPUT CODE STREAM  100110 100101 100000 1101111 001 11001 111000 1010
                                                    27

INPUT COEFFICIENT EXAMPLE
FIG. 16C  INFORMATION EXAMPLE OF FREQUENCY COMPONENTS TO BE DELETED 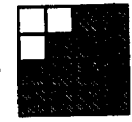 28
FIG. 16D  INPUT COEFFICIENT STREAM  100110 100101 100000 1101111 001 11001 111000 1010
                                    27              29                        30
FIG. 16E  OUTPUT CODE STREAM  100110 100101 100000 1010
                              31

COEFFICIENT SCANNING SEQUENCE

INFORMATION EXAMPLE OF FREQUENCY COMPONENTS TO BE DELETED
FIG. 16H  INPUT CODE STREAM  100110 100101 100000 1101111 00 1 11001 111000 1010
                             27              33      34  35 36          37
                                                        11100↑
FIG. 16I  OUTPUT CODE STREAM  100110 100101 100000 111001 1010
                              38

FIG.17A
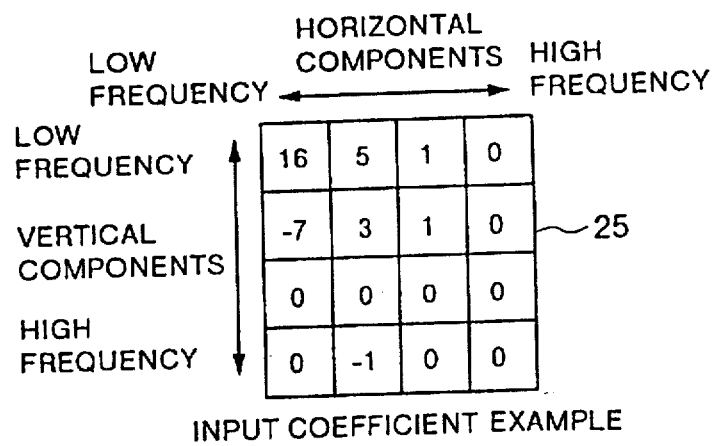
INPUT COEFFICIENT EXAMPLE
FIG.17B
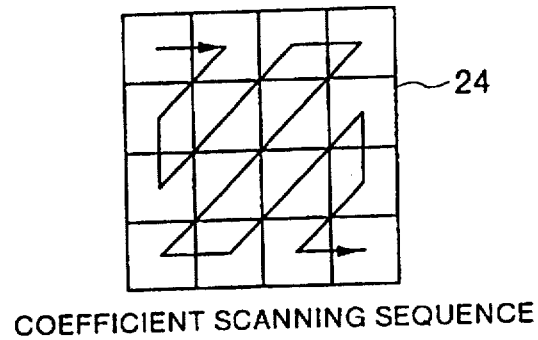
COEFFICIENT SCANNING SEQUENCE
FIG.17C
| | | | | | | | |
|---|---|---|---|---|---|---|---|
| RUN LENGTH NUMBER | | 0 | 0 | 1 | 0 | 1 | 2 | 5 |
| EFFECTIVE COEFFICIENT | 16-10 | 5 | -7 | 3 | 1 | 1 | -1 | (EOB) |
| GROUP NUMBER | 3 | 3 | 3 | 2 | 1 | 1 | 1 | |
| HUFFMAN CODE | 100 | 100 | 100 | 11011 | 00 | 1100 | 11100 | 1010 |
| ADDITIONAL BITS | 110 | 101 | 000 | 11 | 1 | 1 | 0 | |
HUFFMAN CODE EXAMPLE
FIG.17D  INPUT CODE STREAM  100110 100101 100000 1101111 001 11001 111000 1010

FIG.18

| GROUP NUMBER | DC DIFFERENTIAL VALUE OR AC COEFFICIENT VALUE | ADDITIONAL BITS NUMBER |
|---|---|---|
| 0 | 0 | 0 |
| 1 | -1,1 | 1 |
| 2 | -3,-2,2,3 | 2 |
| 3 | -7..-4,4..7 | 3 |
| 4 | -15..-8,8..15 | 4 |
| 5 | -31..-16,16..31 | 5 |
| 6 | -63..-32,32..63 | 6 |
| 7 | -127..-64,64..127 | 7 |
| 8 | -255..-128,128..255 | 8 |
| 9 | -511..-256,256..511 | 9 |
| 10 | -1023..-512,512..1023 | 10 |
| 11 | -2047..-1024,1024..2047 | 11 |

METHOD AND APPARATUS FOR CREATING LESS AMOUNT OF COMPRESSD IMAGE DATA FROM COMPRESSED STILL IMAGE DATA AND SYSTEM FOR TRANSMITTING COMPRESSED IMAGE DATA THROUGH TRANSMISSION LINE

BACKGROUND OF THE INVENTION

The present invention relates to a system for creating and displaying compressed image data to shorten the transmission time and decoding time of compressed digital still image data, and also to a system for transmitting and receiving digital motion pictures through a network.

When it is desired to store and transfer still images, since such image data includes enormous amounts of data, it is common practice to compress the image data. As an example of a system for efficiently encoding an image into compressed image data, there is such a system that is a combination of orthogonal transformation, quantization and variable-length coding as shown in FIG. 1A. In this system, as shown in FIG. 1B, a data transmitter side divides an image into a plurality of equal blocks, subjects each block to an orthogonal transformation into a spatial frequency coefficient, subjects the coefficient to a quantization to obtain a quantized value, and subjects the quantized value to a variable-length coding. The transmitter side transmits the codes thus subjected to the variable-length coding to a signal receiver side through a transmission line. The receiver side subjects the received codes to decoding, inverse quantization and then inverse orthogonal transforming to obtain the original image data.

There are two systems of transmitting such variable-length codes as mentioned above; namely, a sequential transmission system for transmitting all codes of each of the blocks of an image sequentially from its upper side to its lower side on an every block basis as shown in FIG. 2A, and a progressive transmission system for partially dividing all codes of each of the blocks into a plurality of code groups and then for sequentially transmitting the code groups (for first transmitting those codes of-each block corresponding to low frequency coefficients, dividing those codes of each block corresponding to high frequency coefficients into a plurality of code groups, and then sequentially transmitting the code groups) as shown in FIG. 3A.

In the sequential transmission system, as shown in FIG. 2B, a clear image can be gradually reproduced from its upper side to its lower side; whereas, in the progressive transmission system, as shown in FIG. 3B, a general rough image can be first quickly reproduced and its image quality can be progressively increased. Since the progressive transmission system can allow a user to recognize the general image of a picture at an initial stage (though the image is not fully clear), this system can be suitably used for image retrieval. As an international standard system for prescribing a compressed image data format which is able to cover both of the aforementioned image compression/transmission systems, there is a recommendation by JPEG,(Joint Photographic Experts Group) which is a joint group of ISO (International Organization for Standardization) and CCITT (International Telegraph and Telephone Consultation Committee).

The details of the sequential and progressive transmission systems are described in a reference book entitled "International Standard for Multimedia Coding", published by Maruzen K. K., pp. 24–42.

The above sequential and progressive transmission systems are highly convenient when properly selected depending on various sorts of applications. To this end, there is considered such a system for previously storing in a memory both of compressed image data of a sequential format and compressed image data of a progressive format for use in the respective transmission systems to selectively use them depending on applications. However, since this system requires previous storage of two sorts of formats of compressed image data for each image data, the data storage capacity of the memory must be about twice that of a memory for storage of a single format of compressed image data.

To avoid this, there has been suggested in JP-A-4-167670 a compressed-image data storage/transmission system wherein only a sequential format of compressed image data is stored in a memory so that, when a request for a progressive format of data is issued, the progressive format of compressed image data is re-created from the sequential format of compressed image data.

Meanwhile, attention is further directed to digital transmission techniques for motion pictures, wherein techniques for compressing the data of motion pictures for network communication have been long studied and applied in practical use. As an international standard system for digitally compressing motion pictures for communication, there is a CCITT recommendation H. 261. In this system, a television signal having less motion can be transmitted in a compressed form having an amount of data corresponding to about telephone one channel (64 kbps) to 30 channels (2 Mbps) and can be applied to a TV telephone/conference system based on an ISDN (Integrated Services Digital Network) line. Note that the ISDN line is different from a LAN (Local Area Network) environment (which will be explained later) in that once connected to a party, a constant line transmission rate is secured. As an international standard system for digitally compressing motion pictures of a large capacity of recording medium, there is an MPEG (Motion Picture Experts Group) system. This is a technique for compressing a full motion picture comparable in quality to a video picture into 1.5 Mbps.

In order to realize motion picture communication in such a LAN environment including a personal computer or a workstation utilizing the aforementioned compression technique, the aforementioned band width must be secured during the communication. Otherwise, there occurs such a disadvantage that data failed to be transmitted overflows from a transmission buffer in a transmitter side, whereas the amount of data necessary for reproduction of the motion picture becomes insufficient and thus the reproduction of the motion picture is interrupted in a receiver side. However, since a LAN generally employs communication control based mainly on a carrier sense multiple access with collision detection (CSMA/CD) system, it is known that, when network traffic increases, collision of transmission data is increased to exponentially increase a propagation delay time. That is, the LAN line is different from the ISDN line having a secured constant line transmission rate in that a band width usable during communication cannot be ensured as a constant value.

As a LAN system capable of coping With such an application that requires real time communication of data as in motion picture communication or voice communication, there has been suggested such a time division multiplexer (TDM) as, for example, described in a book entitled "Local Area Network Formation Technique and its Applications", enlarged edition, compiled under general editorship of Hideo Aizawa, published by Fuji Techno System, pp. 176–179 or in a book entitled "Computer & Network LAN", published by Ohm-sha 1992, Vol. 10, No. 5, pp. 65–70. In this system, such a band width as 4 Mbps or 10 Mbps in LAN is divided with respect to time to define the divided band widths as time slots and the respective time slots are suitably assigned to respective terminals for their communication. In this connection, the IEEE802 Committee has been promoting the standardization of an integrated voice and data LAN (IVD LAN) of the TDM.

There are two TDM systems; viz., a stationary system for uniquely assigning time slots to respective terminals, and a demand assign system in which each of the respective terminals demands the number of time slots necessary for communication with a TDM controller and the controller dynamically assigns the time slots to the respective terminals. In the case of motion picture communication, since one terminal requires a network to have a broad band width, the demand assign system is suitable for that purpose because this system can dynamically assign time slots to a terminal requesting the motion picture communication.

Consider now, for example, a case where a single controller and three terminals are connected to a 4 Mbps LAN to carry out communication over a motion picture compressed based on the aforementioned MPEG system as shown in FIG. 4. In the drawing, reference numerals 201, 202 and 203 denote such terminals that want to perform the motion picture communication, while numeral 204 denotes a 4 Mpbs LAN and 205 denotes a controller for performing TDM control over the LAN 204. In this case, when such a stationary system for equally assigning time slots to the terminals 201, 202 and 203 as mentioned above is employed, 1-Mbps transmission slots are assigned to each of the terminals 202, 202 and 203, as shown in FIG. 5A. For the purpose of transmitting a motion picture compressed based on the above MPEG system, this requires 1.5 Mbps of bit rate. Thus, this system cannot provide a sufficient band width and the LAN is required to be changed to a more-than-6.0 Mpbs (1.5×4=6.0 Mbps) LAN.

If only the terminal 201 is transmitting the motion picture and the other two terminals are transmitting such data requiring no real time as code data, then the above problem can be eliminated by removing the 1 Mbps transmission slot assigned to the two terminals and assigning them to the terminal in the motion picture communication. This can be realized by the aforementioned demand assign system.

To dynamically increase or decrease the number of transmission time slots by the demand assign TDM system means such an assumption that the LAN has an opening in the transmission time slots assigned to the other terminals. In other words, when it is desired in the above LAN to transmit motion pictures simultaneously from the 3 terminals and the controller assigns the time slots equally to the respective terminals, the demand assign system can eventually assign only 1 Mbps to each terminal as in the stationary system. And thus, it is necessary to decrease the amount of data in the motion pictures per unit time by some means.

The aforementioned H. 261 system, as disclosed in JP-A-2-52581, has a quality-weighted compression mode and a motion-weighted compression mode. In this system, when the motion of a motion picture to be compressed is slow or small, weight is given to picture quality to positively perform frame decimation for data compression; whereas, when the picture motion is large, weight is given to the motion to positively lower the picture quality for data compression, whereby the data rate of a compressed motion picture is maintained at 64 kbps.

Let us consider the compression and expansion of still image picture first. It is generally known that a conventional means for decoding a compressed image has both of the sequential and progressive format functions or has only the sequential format function. According to the aforementioned JPEG recommendation, any decoding means compliant with JPEG must have the sequential format function as a basic function and have the progressive format function as an extension function. Therefore, for the purpose of allowing handling of identical compressed image data in any system, it is desirable for the compressed image data stored in a memory (such as information recording medium) to have a sequential format. It sometimes occurs that the user wants to quickly confirm the contents of the compressed image data of the sequential format in the form of an unclear image having at least such quality that the user can recognize its rough contents. The latter is, e.g., when the user wants to perform image retrieval from a large quantity of image picture libraries.

Shown in FIG. 6 is a structure of a client and file server showing an example of a prior art image file retrieval system. In the drawing, numeral 39 denotes a file server having compressed image data of the sequential format therein, 40 represents an information memory medium for storing the compressed image data therein, 41 denotes a communication network for data transfer, 42 denotes a client who demands the compressed image data, 1 represents a compressed image data reproducer for expanding the compressed image data of the sequential format to display it thereon, 43 indicates a path (or its direction) in which a compressed image data request signal flows on a bus connected to the communication network 41 or connected between the communication network 41 and the file server 39 or client 42, and 44 represents a path (or its direction) in which the compressed image data flows on the bus connected to the communication network 41. In this case, the communication network 41 may comprise a local area network (LAN), a wide area network (WAN), or any other means.

When the user client 42 requests the compressed image data, the client 42 issues a compressed image data request signal to the file server 39 through the path 43. The file server 39, in response to the received compressed image data request signal, sends the compressed image data from the information memory medium 40 to the client 42. The client 42, when receiving the compressed image data, decodes the data in the compressed image data reproducer 1 for its display thereon. If the user judges that the data is not of his intended image, then the user again requests other compressed image data. This is the basic operation of image retrieval.

Such a sequential image file retrieval system, however, undesirably requires a large amount of time between the request of the compressed image data and the actual rough image display thereof. Therefore, the first of the above problems is the time (transmission time) necessary for transmitting the compressed image data. Assume that the compressed image data results from a natural image picture of full color 640×480 pixels. Then, since the compression ratio of a natural picture is generally known as between 1/10 and 1/30, the amount of the compressed image data becomes about between 2.5 Mbit and 7.3 Mbit. Thus, when such a data amount is transmitted through a communication network having a transmission rate of 64 kbit/s, the transmission time necessary until the end of the transmission becomes about between 3.9 and 11.5 sec.

Further, decoding of the compressed image data must be carried out before its display, and therefore decoding time also becomes significant. The decoding time, which depends on the performance of the decoding means, increases especially the decoding of the compressed image data carried out based on software.

For the aforementioned reasons, the sequential system requiring a large amount of time to display one picture has a disadvantage that the system cannot efficiently perform such picture retrieving operation of a desired picture from many pictures displayed.

In order to avoid such a disadvantage, there is suggested in the earlier-mentioned JP-A-4-167670 a transmission system wherein compressed image data of a sequential format is decoded to a level after the quantization level and then subjected to a variable length coding of a progressive format to re-create and transmit compressed image data of the progressive format. A receiver side for the compressed image data decodes and displays the received data with use of a decoding means of the progressive format to allow the user to quickly confirm it. That is, the user can judge, at a stage of display of a general rough image prior to a clear image, whether or not the picture is a desired one, which results in that when the picture is not the desired one, the user can perform the next picture retrieving operation without waiting for the appearance of its full and clear image. As a result, such picture retrieval as mentioned above can be made high in efficiency.

However, this conventional technique involves troublesome re-creation of the compressed image data of the progressive format from the compressed image data of the sequential format and also requires the data receiver side to have a decoding means for decoding the compressed image data of the progressive format. In addition, the sequential format decoding means actually spreads more widely than the progressive format decoding means and thus it is not always guaranteed that the data demand side has the progressive format decoding means. Differences between the sequential and progressive format decoding means are described in a magazine entitled "Video Information", Sangyo Kaihatsu Kiko K. K., June, 1991, p. 41.

When the contents of compressed image data are confirmed only by the sequential format decoding means not provided with the progressive format decoding means, the technique disclosed in the aforementioned JP-A-4-167670 cannot be used, and therefore one picture cannot be confirmed until the compressed image data of the sequential format is decoded and its full and clear picture is displayed. The time necessary for the appearance of the clear entire picture is large as already explained above in connection with FIG. 2B, during which the user must wait for the entire clear display.

Further, when the compressed image data of the sequential format is called, since preview (causing display of a plurality of reduced pictures on one display screen) is used, the compressed image data is displayed on a display means in a reduced size as compared to its original picture size. In the conventional technique, in this case, all the compressed image data are called and then subjected to decoding and reducing operation for its display. However, the compressed image data prior to the subjection of the reducing operation correspond to the data of a picture having a size larger than a region (reduced picture display region) for display of a reduced picture. For this reason, the amount of the compressed image data prior to the reducing operation is larger than that of the compressed image data of a picture having the same size of the reduced picture display region, which requires a redundant time in its transmission and decoding.

Next, consider a still-picture file retrieval system wherein picture data in an information memory medium having lots of picture data stored therein are sequentially read out from the memory medium to retrieve a target picture therefrom. There are two types of picture file retrieval systems, viz. such a network type as shown in FIG. 6 and a stand-alone type for performing retrieving operation directly from the information memory medium without any intervention of a communication network. The stand-alone type can be considered to be equivalent to the network type so long as an internal bus is used in place of the communication network. In general, picture data for the picture file retrieval system is frequently subjected to a picture compression for the purpose of memory saving or transmission time reduction. However, even when the picture data is subjected to the compression, since the transmission and decoding times are long before the appearance of the entire picture, it is impossible to realize efficient retrieval. Meanwhile, in the picture retrieval, it is unnecessary to use each clear picture image. In other words, when picture images having sufficient quality for the user to confirm the contents of the images are sequentially displayed, as if leafing the pages of a book for the purpose of retrieval, efficient retrieval can be realized.

Explanation will then be made as to the compression and expansion of motion pictures. As already explained above, there are two methods of reducing the amount of data in a motion picture to be transmitted per unit time, i.e., frame decimation and picture quality reduction. Of motion pictures, some contain important information, for example, regarding what part of a human body moves at what time in what way, such as when a sports instructor teaches how to pitch a baseball or how to swing a tennis racket or when conversation is done through sign language. In such cases, information on person's face or clothing is not important and it becomes important to transmit the motion picture information at a rate of 30 frames per second even with its somewhat reduced resolution. In other words, there sometimes occurs such a case where priority must be given to the frame rate over resolution, depending on the type of motion picture data to be transmitted.

According to the H.261, as already mentioned above, when the motion of a reduced motion picture is small, the system is put in a quality-weighted compression mode to positively perform frame decimation. And when the motion of the compressed motion picture becomes more active, the quality-weighted mode is gradually shifted to the motion-weighted compression mode. Thus, the first part of the compressed motion picture motion at the start of motion activity becomes a missing frame and thus the right motion cannot be transmitted.

In a TV conference system using a plurality of cameras including a rotary camera as disclosed in JP-A-2-52581, a mode is switched between quality-weighted and motion-weighted compression modes in synchronism with the activation or deactivation of the rotary camera or with the switching of input of the camera to thereby prevent such a missing frame as the above and allow reproduction of a smooth motion picture. This technique is valid when an object to be projected has substantially no motion and the timing of increasing the motion of the compressed motion picture is clear in advance as in a TV conference system, but cannot be applied to compression of general motion pictures. Further, when a method for fixing the system to the motion-weighted compression mode is employed, the system has no such an arrangement corresponding to the aforementioned LAN, that is, when the band width of a usable network varies during communication, the system cannot cope with it.

SUMMARY OF THE INVENTION

It is a first object of the present invention to provide a picture file retrieval system which, even when using a sequential format decoding means, can quickly obtain a general picture image of low quality from compressed image data of a sequential format.

A second object of the present invention is to provide a picture file retrieval system which can easily obtain reduced image data from compressed image data of a sequential format.

A third object of the present invention is to provide a picture file retrieval system which can vary the quality of a retrieval picture according to a retrieval-picture changing rate.

A fourth object of the present invention is to provide a digital motion picture compression system which can vary the amount of image data in a motion picture according to the band with of a network, and also to provide a real-time motion picture communication system using the compression system.

In accordance with an aspect of the present invention, the above first object is attained by providing a picture file retrieval system which comprises: at least a file server having a memory means for storing therein compressed image data of a sequential type; a client terminal having a decoding means for expanding the compressed image data of the sequential format; a display means for displaying data expanded by the decoding means; wherein an input means for externally inputting a degree of roughness of a picture image to be displayed on the display means is provided in the client terminal, and compressed-image-data code deletion means is provided in the file server for receiving the compressed image data stored in the memory means and deleting predetermined data from the compressed image data on the basis of the rough degree input from the input means and outputting the remaining data subjected to the deletion to the decoding means.

In accordance with another aspect of the present invention, the above second object is attained by providing a picture file retrieval system wherein, in addition to the above arrangement, the client terminal further includes a reduction-rate input means for externally inputting a reduction rate of an image to be displayed on the display means and a reduction means for receiving data expanded by the decoding means, thus reducing the received data according to the reduction rate input from the reduction-rate input means and outputting it to the display means. In this connection, the compressed image data code deletion means may be arranged to delete the predetermined data according to the reduction rate input from the reduction rate input means.

In accordance with a further aspect of the present invention, the above third object is attained by a picture file retrieval system wherein the compressed image data stored in the memory means are variable length codes, and the compressed image data code deletion means includes: a variable-length code decoding means for receiving and decoding the variable-length codes of the compressed image data stored in the memory means and outputting decoded variable-length codes to output a group of coefficients corresponding to a plurality of frequency components; a frequency component deletion means for deleting part of predetermined frequency components from the group of frequency component coefficients on the basis of a demand quality roughness; and a variable-length coding means for subjecting the coefficient group after deletion of the frequency component coefficients by the frequency component deletion means to a variable-length coding.

Alternatively, the compressed image data stored in the memory means may be variable-length codes, and the compressed image data code deletion means may include: a variable-length code decoding means for receiving an array of the variable-length codes of the compressed image data stored in the memory means and for decoding the variable-length codes to output positions of the variable-length code stream corresponding to the frequency component coefficients indicated by the variable-length codes; a control means for specifying ones of the frequency component coefficients to be deleted; and a variable-length code edit means for detecting the positions of the variable-length codes corresponding to the frequency component coefficients specified by the control means on the basis of an output of the variable-length code decoding means and for deleting the variable-length codes of the detected positions from the input variable-length codes.

In accordance with yet a further aspect of the present invention, the above fourth object is attained by providing a real-time motion picture communication system which comprises: a means for digitizing a motion picture into bit map data; a means for converting the bit map data into data for spatial frequency regions; a means for selecting the data having frequency components from a low frequency and a high frequency from the data of the spatial frequency regions; a means, when the network traffic becomes heavy, for moving the high frequency data values to a lower frequency side; and a means, when the network traffic becomes light, for moving the high frequency data values to a higher frequency side.

In accordance with yet another aspect of the present invention, the above fourth object may be attained by providing a network system which comprises: a transmission line for securing data within a predetermined band width for communication; a plurality of terminals connected to the transmission line for transmitting data to the transmission line; and a control means connected to the transmission line for assigning a time slot number to each of the plurality of terminals according to the amount of data to be handled by each terminal; wherein the data transmission of each terminal to the transmission line is carried out on the basis of the assigned time slot, and wherein each terminal has a means for limiting high spatial frequency components of the transmission data according to a traffic state of the transmission line from the control means, and data communication is carried out while maintaining a frame rate of the transmission data to secure the band width of the transmission line at a predetermined value.

In accordance with yet another aspect of the present invention, the above fourth object may be attained by a network system which comprises: a transmission line for securing data within a predetermined band width for communication; a plurality of terminals connected to the transmission line, wherein each of the terminals is provided therein with a means for detecting a traffic of the network; a means for converting image data to be transmitted on a real time basis into spatial frequency components; a means for limiting high frequency component data; and a means for transmitting the limited data onto the transmission line.

The compressed image data code deletion means in the invention for attaining the first object deletes desired frequency components of the compressed image data of the sequential format transmitted from the information memory medium and transmits the variable-length codes corresponding to the remaining frequency component data again as the compressed image data of the sequential format. As a result, the system can reduce the amount of data to be transmitted without modifying the compressed image data being stored in the information memory medium, thereby enabling reduction of a data transmission time and image decoding time. The compressed image data transmitted from the compressed image data code deletion means, if subjected to a mere high frequency component deletion, can be quickly restored to such a picture image that is the same as the initial stage of the progressive format and that expresses a rough general image with a low resolution, without modifying an existing sequential format decoding means.

The reduction means in the invention for attaining the second object, when a reduced picture image is demanded, deletes high frequency component codes according to a required reduction rate (deletes more component codes for a larger reduction rate) and as described above, transmits the variable-length codes corresponding to the remaining frequency components again as the compressed image data of the sequential format. The compressed image data is decoded and reduced by the reduction means, whereby a desired reduced picture image can be obtained. Even in this case, when only such low frequency components as to allow display of a rough reduced image remain and the other high frequency components are deleted, the total amount of data can be reduced and the transmission time and decoding time of compressed image data can be shortened.

In the picture file retrieval system for attaining the third object of the present invention, when there is provided a deletion information input means for allowing the client to adjust a display speed of the next or previous picture of the compressed image data within the file server (or for specifying the roughness of the picture), picture retrieval can be facilitated with a high rate of efficiency. Further, since displaying rough pictures while changing the picture display speed resembles browsing or retrieving in the pages of a book while leafing the pages, the user can quickly and easily conduct picture retrieval.

In the network system for attaining the fourth object of the present invention, the means for digitizing a motion picture into bit map data digitizes a motion picture received from a camera and converts it into bit map data. The bit map data thus converted are converted into data for spatial frequency regions by the means for converting bit map data into spatial frequency regions. The means for selecting data of the frequency components from a low frequency A to a high frequency B from the data of the spatial frequency regions, limits a range of frequency components of motion picture data to be transmitted to a communication party. The means, when the network traffic becomes heavy, for moving the value of the frequency B to a lower frequency side, controls the means for selecting the data of the frequency components between the low frequency A and the high frequency B in such a manner that the data of the high frequency components are deleted. As a result, the range from the low frequency A to the high frequency B becomes narrow and the amount of transmission data per unit time is reduced, whereby a situation can be avoided in that the system fails to transmit all the motion picture data per unit time due to a confusion in the network. In the system of the invention, even though high frequency components are cut off or removed so that the resolution of the picture becomes lower than usual, the frame rate is maintained without being lowered. Further, the means, when the traffic of the network is light, for moving the value of the frequency B to a higher frequency side, controls to cause the data of the higher frequency components to be transmitted, whereby motion picture communication can be realized with a high resolution while maintaining the frame rate.

BRIEF DESCRIPTION OF THE DRAWINGS

FIG. 13 shows an example of a Huffman code table for differential DC coefficients;

FIGS. 14A and 14B show an example of a Huffman code table for AC coefficients;

FIGS. 16A to 16I are diagrams for explaining the function of a variable-length code edit means in the present invention;

FIGS. 17A to 17D are diagrams for explaining a specific example of coding;

FIG. 18 shows how to group DC differential values and AC coefficients;

DESCRIPTION OF THE PREFERRED EMBODIMENTS

Embodiments of the present invention will be detailed with reference to the accompanying drawings.

Figure 6:
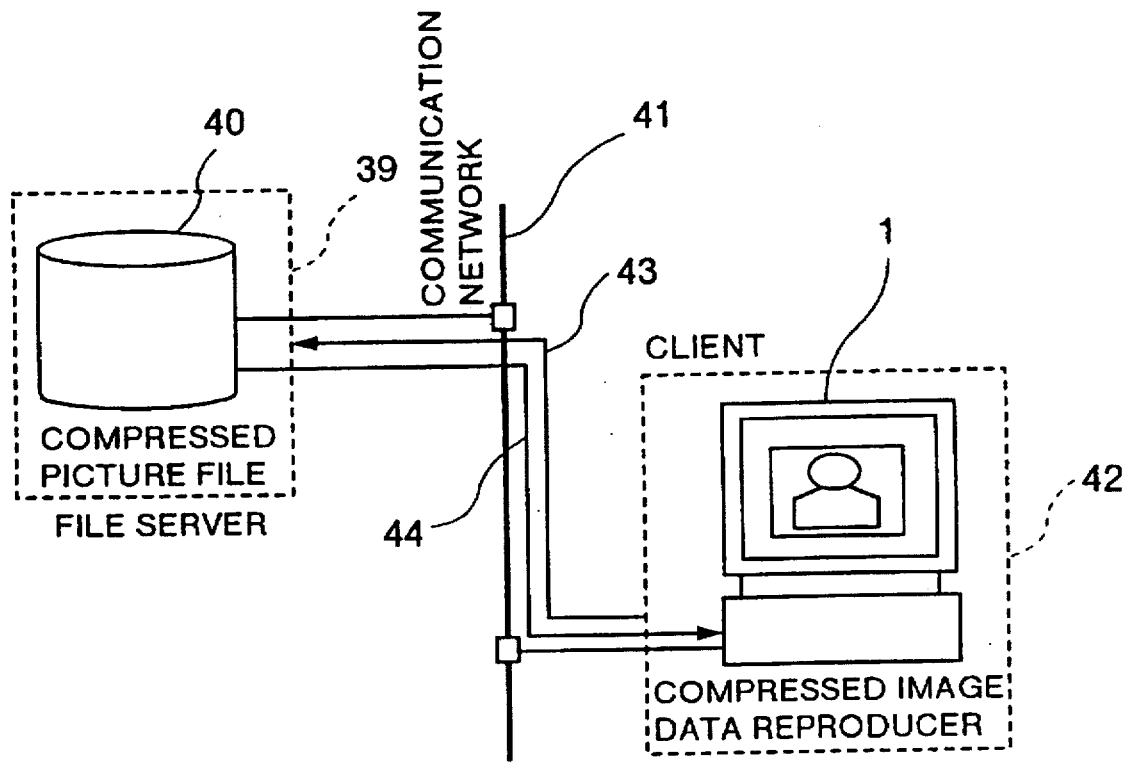
FIG. 6 shows an example of a prior art picture file retrieval system.
Figure 7:
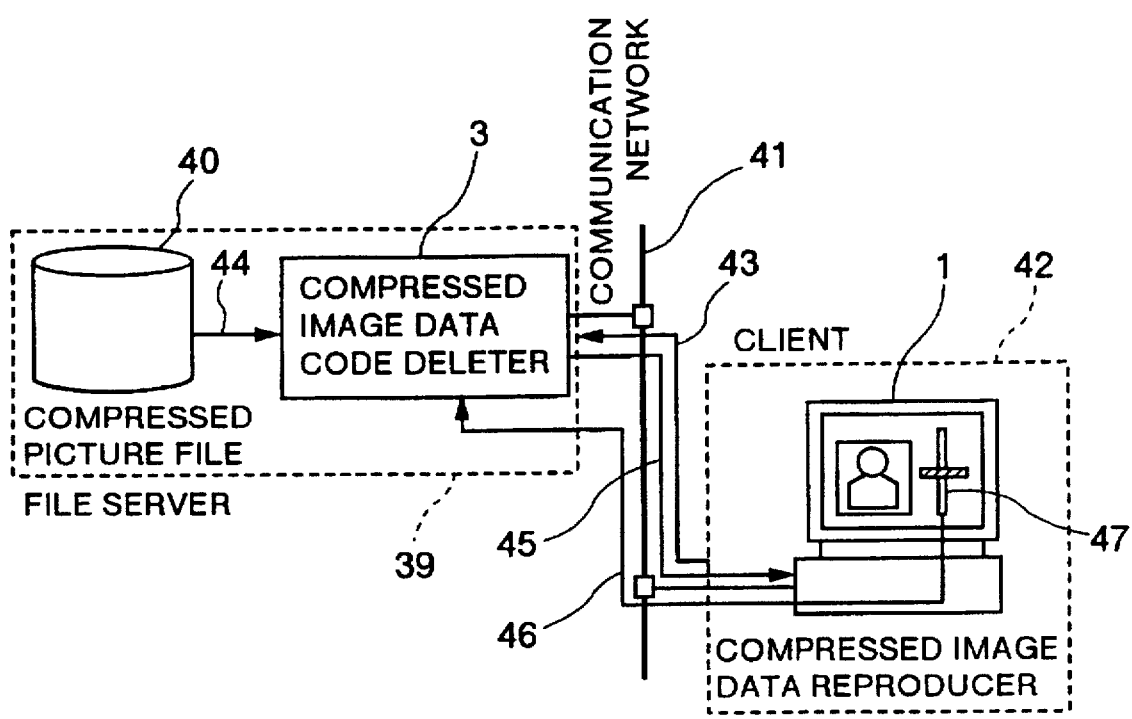
FIG. 7 shows an example of a picture file retrieval system of the present invention using, a compressed image data code deleting means.

Referring first to FIG. 7, there is shown an example of a picture file retrieval system to which the present invention is applied. In the drawing, the illustrated system includes a compressed image data code deletion mean 3 which forms part of the features of the present invention, a path 45 through which a control signal for control of compressed image data flows, and a deletion information input means 47 (which will be detailed later as a third embodiment of the present invention). The other parts having the same reference numerals as those in FIG. 6 have the same functions as those of FIG. 6. In the drawing, a file server 39 and a client 42 are connected to a communication network 41 to form the picture file retrieval system. When the communication network 41 is replaced by an internal bus or the like, however, the illustrated system can also be considered to be a stand-alone type picture file retrieval system.

Figure 8:
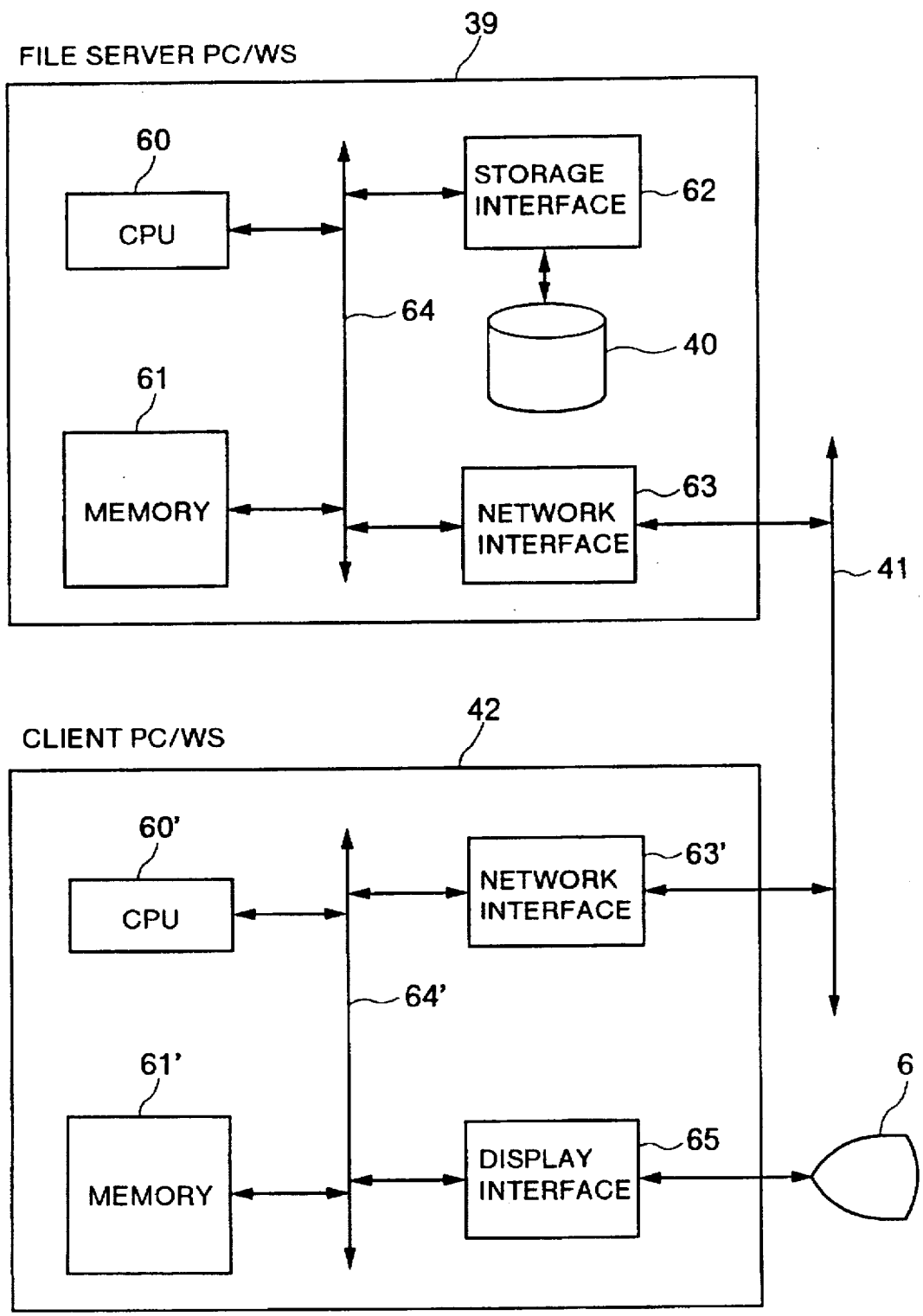
FIG. 8 shows a detailed arrangement of the picture file retrieval system of FIG. 7.

Shown in FIG. 8 is an example of a detailed arrangement of the system of FIG. 7. In FIG. 8, the file server 39 comprising a personal computer or workstation has a central processing unit (CPU) 60, a memory 61, a storage interface 62, a storage 40 such as a hard drive, a network interface 63 and an internal bus 64. The client 42 comprising a personal computer or workstation has a CPU 60', a memory 61', a network interface 63, an internal bus 64' a display interface 65 and a display 6. Numeral 41 denotes a network such as a communication network.

Figure 9:
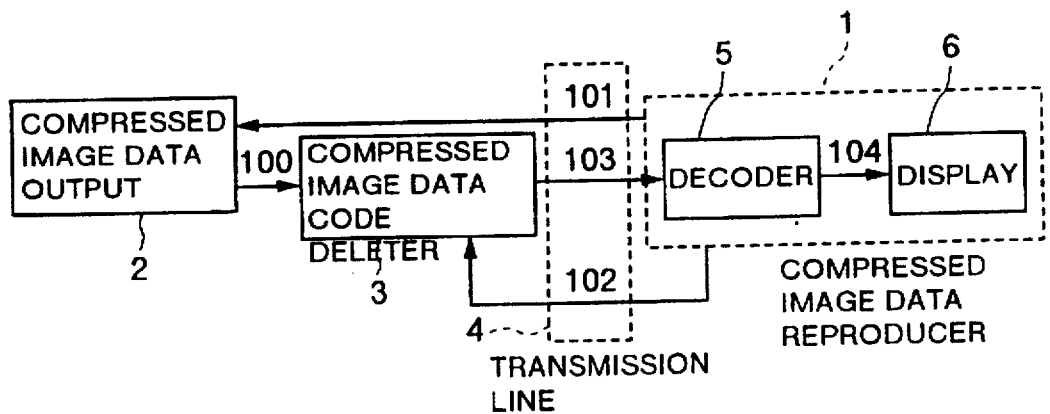
FIG. 9 shows an arrangement of a rough general picture display system in accordance with a first embodiment of the present invention.

FIG. 9 shows a first embodiment of the present invention having a compressed image data reproduction means 1, a compressed image data output means 2, a compressed image data code deletion means 3, a transmission line 4, a decoding means 5 and a display means 6 for attaining the first object of the invention.

More specifically, the compressed image data reproduction means 1 for requesting compressed image data transmits a request signal for the compressed image data of a picture requesting its general rough display (i.e., picture of low quality to be displayed) to the compressed image data output means 2 through a path 101. The compressed image data reproduction means 1 also transmits to the compressed image data code deletion means 3, via a path 102, a control signal containing the necessity or non-necessity of parameters (such as a quantization table and coding table) necessary for decoding, the necessity or non-necessity of code deletion of the compressed image data and also containing information on frequency components to be deleted (information relating to the roughness of the picture). The information on frequency components to be deleted may refer to information for specifying desired frequency components or information for specifying a rate of effective coefficients (corresponding ones of the frequency components not zero) to be deleted. When the frequency components to be deleted are expressed as the effective coefficient rate, many effective coefficients can be left even in a block containing a large quantity of non-zero high frequency components, whereby the picture can be expressed depending on the complexity of the picture, i.e., the number of frequency components contained.

The compressed image data output means 2 transmits the compressed image data to the compressed image data code deletion means 3, via a path 100, according to the compressed image data demand signal. The compressed image data output means 2 outputs the requested compressed image data of the sequential format directly from an information memory medium or indirectly from the information memory medium via a communication means as a transmission line.

The compressed image data code deletion means 3 performs partial deletion of the data codes on the basis of the control signal received from the compressed image data reproduction means 1. After the code deletion, the compressed image data code deletion means 3 transmits the compressed image data subjected to the partial code deletion to the decoder 5 through the path 103.

The paths 101, 102 and 103 wired between the compressed image data reproduction means 1, compressed image data output means 2 and compressed image data code deletion means 3 may be replaced by the same transmission line 4. The transmission line 4 may comprise a device internal bus or such a communication means as a local area network (LAN) or a public line. On the path 103, the total amount of the compressed image data subjected to the partial code deletion is smaller than that of the output compressed image data of the compressed image data output means 2. For this reason, the data transmission time can be shortened. In particular, when the compressed image data is transmitted through the communication means as the transmission line 4, the lower the transmission rate of the communication means is, the more effective the system is.

The compressed image data subjected to the partial code deletion is decoded into image data in the decoder 5 and output to a path 104. Even in the decoder 5, since the total amount of codes in the compressed image data are made smaller, the decoding time can be shortened. This becomes effective especially when the decoder 5 is implemented in the form of software.

The display means 6 displays a picture image thereon based on the image data received from the path 104. The picture image displayed on the display 6, when the received image data is subjected to the deletion of high frequency components, becomes a rough general picture.

In this system, when the user initially requests the display of a clear picture image without any deletion of sequential format codes, the control signal issued to the compressed image data code deletion means 3 from the compressed image data reproduction means 1 is arranged so that the compressed image data code deletion 3 performs no partial code deletion of the compressed image data issued from the compressed image data output means 2 and outputs it as it is.

After the compressed image data once subjected to the partial code deletion is decoded and displayed, if the user wants a clear image of the same picture, it can be realized in the following manner. That is, a parameter necessary for the previous decoding of the decoder 5 is previously stored so that, when the parameter can be used, the compressed image data reproduction means 1 transmits to the compressed image data code deletion means 3 a control signal so as to delete a parameter necessary for coding and thereafter a re-transmission request for the compressed image data is issued. As a result, the transmission time and decoding time can be reduced during the re-transmission.

Figure 10:
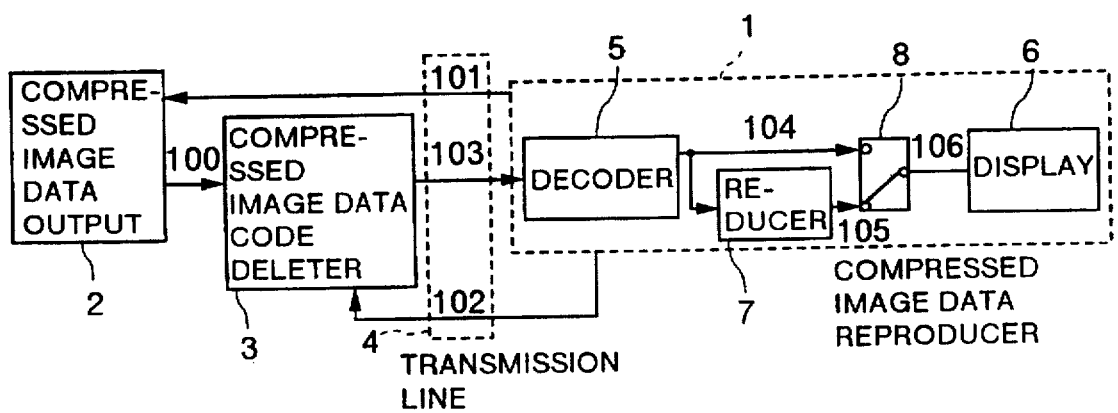
FIG. 10 shows an arrangement of a reduced picture display system in accordance with a second embodiment of the present invention.

There is shown in FIG. 10 an example of an arrangement of a system comprising a compressed image data code deletion means and a reduction means in accordance with a second embodiment of the present invention for attaining the second object of the invention. In the drawing, numeral 7 denotes a reduction means, numeral 8 denotes a switch, and parts having the same reference numerals as those in FIG. 9 have substantially the same functions. In FIG. 10, the reduction means 7 and switch 8 are provided between a decoder 5 and a display means 6 to enable display of a reduced picture image. Parts 1 to 6 operate substantially in the same manner as those in FIG. 9, except for operations to be explained below.

Figure 1A:
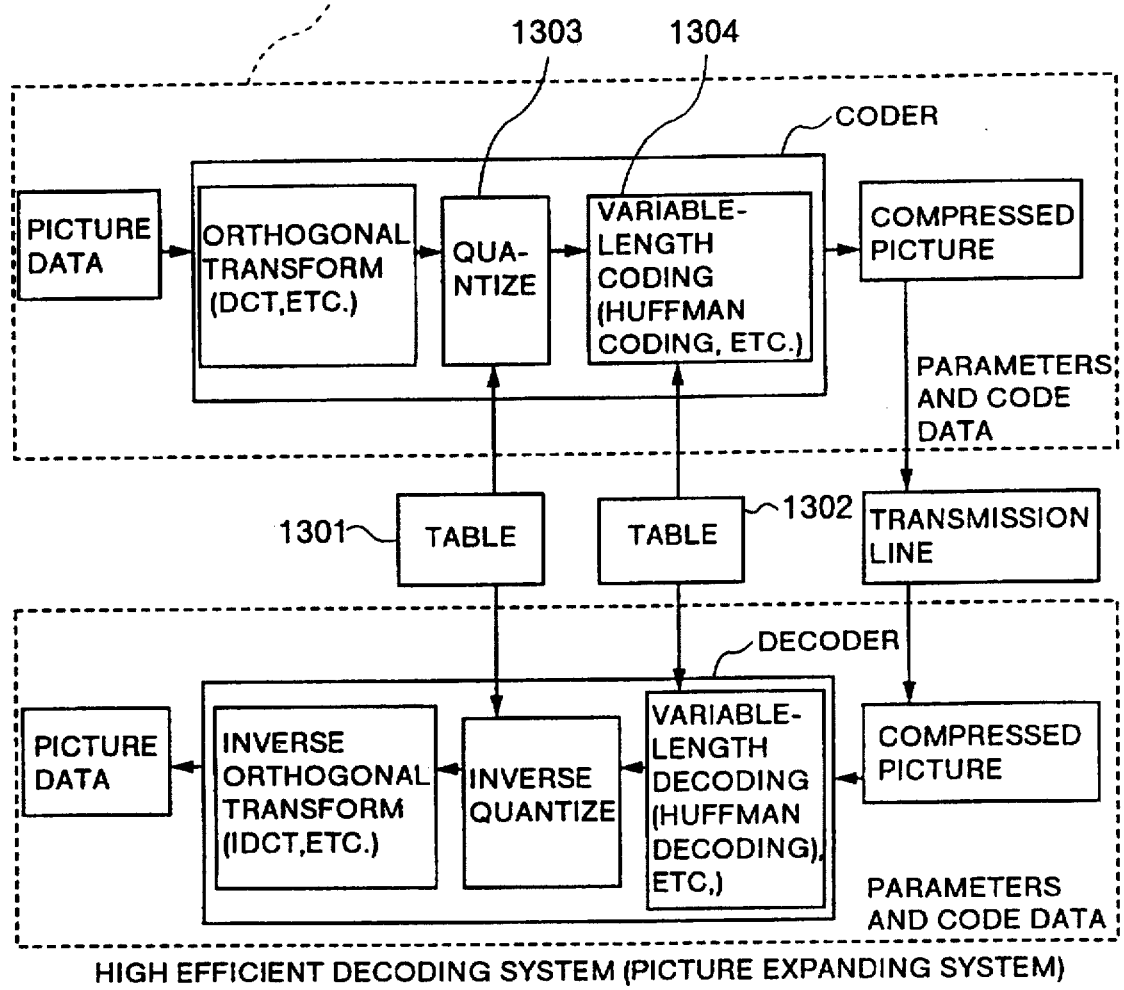
FIGS. 1A and 1B are diagrams for explaining a system for coding and decoding picture data.
Figure 1B:
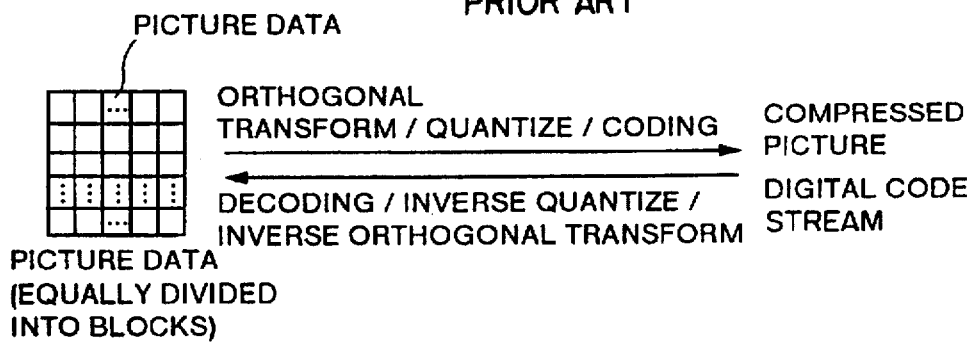
Figure 2A:
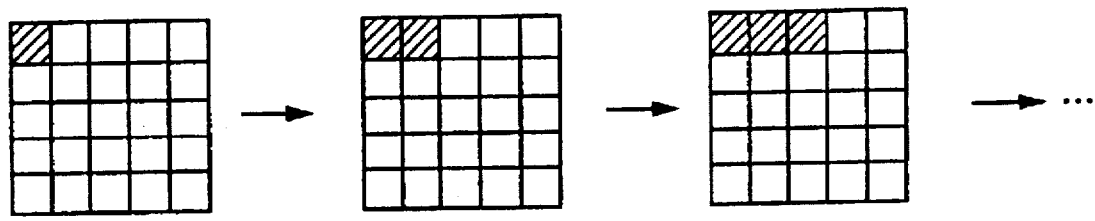
FIGS. 2A and 2B are diagrams for explaining a sequential system.
Figure 2B:
Figure 3A:
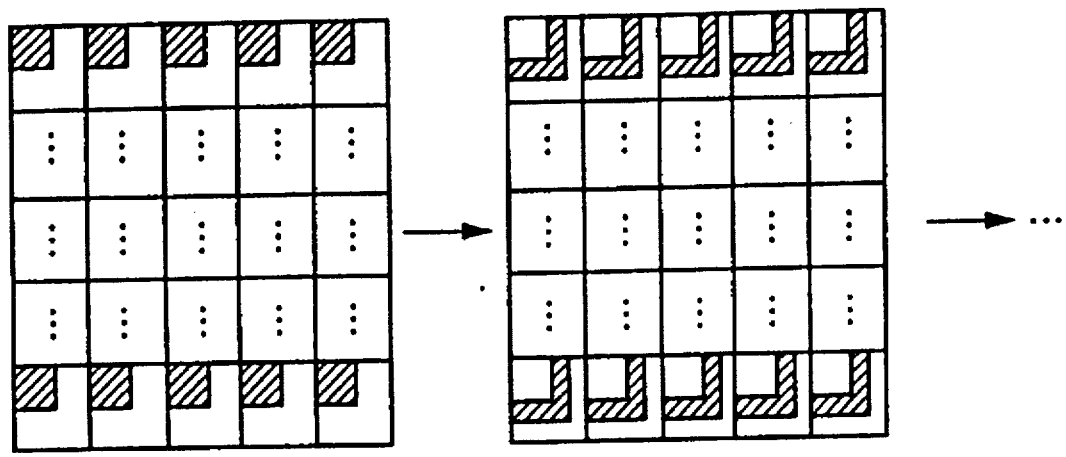
FIGS. 3A and 3B are diagrams for explaining a progressive system.
Figure 3B:
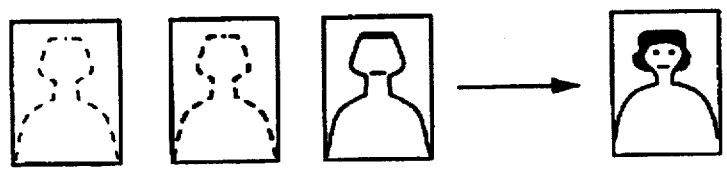

In operation, the compressed image data reproduction means 1 for demanding compressed image data determines, according to a reduction rate, information of the control signal (to be sent to the compressed image data code deletion means 3) for specifying frequency components to be deleted. The reduction rate can be arbitrarily set. However, when the reduction rate is set to be a divisor of pixel numbers in the row and column of blocks (see FIG. 1B) corresponding to equal divisions of the picture at the time of the picture compression, the determination of frequency components to be deleted can be facilitated. Assume, for example, that a picture to be compressed was equally divided into 8×8 pixel blocks and then compressed. Then since divisors of 8 include 8, 4 and 2, when the reduction rate is set to be ⅛ for both of the row and column of the blocks, 63 of 64 coefficients (frequency components) other than a D.C. component can be deleted as frequency components to be deleted. That is, the frequency components other than the D.C. frequency component can be uniquely determined as frequency components to be deleted.

The picture data 104 decoded by the decoder 5 is transmitted to the reduction means 7, so long as the switch 8 connects paths 105 and 106 together. If the path 104 is not connected to the path 106, then the system of FIG. 10 has the same arrangement as the system of FIG. 9.

The reduction means 7 can reduce data based on any one of known reduction systems. For example, a decimation-based reduction system or a reduction system based on a representative average of ambient pixel values may be employed as the reduction system. Picture data reduced by the reduction means 7 is transmitted to the display means 6 via the paths 105 and 106.

The display means 6 can display thereon the reduced picture received from the path 106.

In this system, when the initially user requests a clear picture image that is not subjected to the partial deletion of the sequential format codes, a control signal issued from the compressed image data reproduction means 1 to the compressed image data code deletion means 3 requires the compressed image data code deletion means 3 not to delete part of the codes of the compressed image data issued from the compressed image data output means 2. In this case, when the switch 8 connects the paths 104 and 106 together, the display means 6 can display a clear picture image thereon.

After the compressed image data once subjected to the partial code deletion is displayed as a reduced picture image, if the user wants a clear picture not subjected to any reduction with respect to the same picture, this can be realized by the switch 9 connecting the paths 104 and 106 together as in the first embodiment of FIG. 9. As a result, the transmission time and decoding time during re-transmission can be reduced.

The above embodiment can be applied not only to still picture but also to motion picture to be compressed With the same data format. As will be seen latter, since the compressed data of a motion picture includes a large amount of data, transmission of a clear motion picture having a smooth motion requires the transmission rate to be made very large. When the motion picture compression is based on orthogonal transforming, quantization and variable-length coding, and when high frequency components are deleted through a system having a similar arrangement to the above, a compressed motion picture having a smooth motion can be transmitted with a low transmission rate, though it is not clear.

Figure 11:
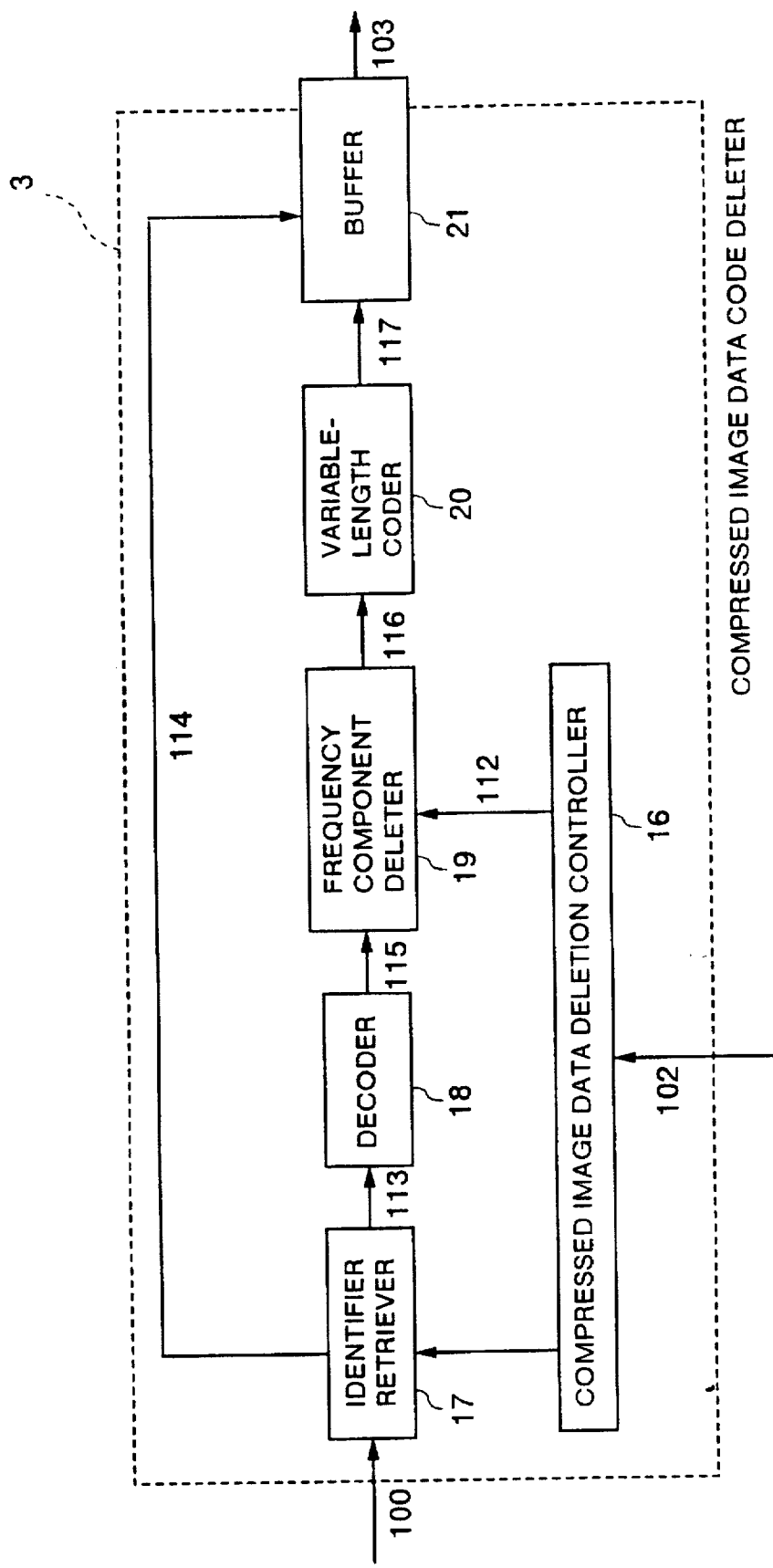
FIG. 11 shows an arrangement of a first compressed image data code deletion means for deleting desired frequency components from compressed image data in the present invention.

FIG. 11 is a first example of a detailed structure of the compressed image data code deletion means 3 of the present invention, which includes a compressed image data code deletion controller 16, an identifier retrieval means 17, a decoder 18 for decoding variable-length codes a frequency component deletion means 19, a variable-length coder 20 and a buffer 21.

Compressed image data of the sequential format as an input of the identifier retrieval means 17 may employ a data format based on any existing system of the orthogonal transforming, quantization and variable-length coding. Assume in this connection that a uniquely recognizable identifier is attached to each header of the coding table, quantization table and variable-length code table in the transmitted compressed image data for their identification.

The compressed image data code deletion controller 16, on the basis of a control signal received from a path 102, outputs to a path 111 another control signal indicative of instruction of separation/deletion of a data part of the received compressed image data having an identifier or indicative of pass-by of the compressed image data without being subjected to any processing, and also outputs to a path 112 information indicative of frequency components to be deleted.

The identifier retrieval means 17 retrieves the identifier of the compressed image data of the sequential format received from a path 100, and outputs to a path 113 information (such as a coding table and a coding table change-over information) necessary for the variable-length code coding and variable-length code decoding and also outputs to a path 114 all data other than such variable-length codes as a quantization table and a coding table. The identifier retrieval means 17, on the basis of the control signal received from the path 111, also can remove a data part having a desired identifier from the data other than the variable-length codes or merely pass the compressed image data directly onto the path 114.

Figure 12A:
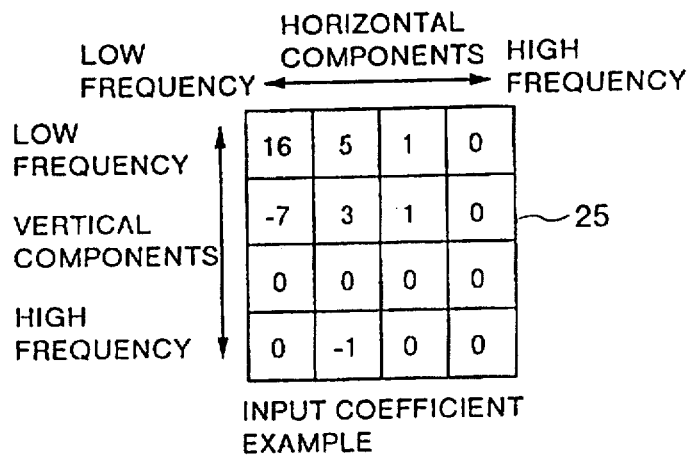
FIGS. 12A to 12E are diagrams for explaining the function of the frequency component deletion means.

The decoder is decodes the variable-length codes received from the path 113 to obtain such a group of coefficients of frequency components for each block as shown in FIG. 12A, and outputs them onto a path 115. The decoding can be carried out by referring to such coding tables as shown, for example, in FIGS. 13, 14A and 14B.

Figure 12B:
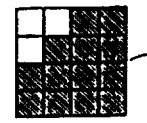
Figure 12C:
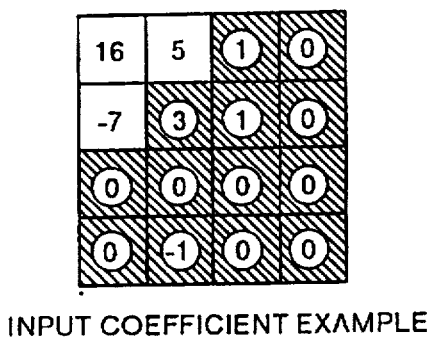

The frequency component delete 19 collates the information of the frequency components to be deleted received from the path 112 with respect to the coefficient group received from the path 115 and deletes part of the coefficient group. For example, assume that the above information indicates the deletion of such a hatched area of the frequency components as shown in FIG. 12B. In this connection, the information on the deletion of the frequency components to be deleted indicates that coefficients to be deleted are determined by the amounts of effective coefficients (frequency components not being zero) of the coefficient group. If ⅘ of the effective coefficients are to be deleted for example, then blocks having a greater number of effective coefficients out number the other blocks and thus picture display can be realized according to the complexity of the block. Further, when the to-be-deleted frequency component information contains a D.C. component, an intermediate value in a valid value range can be replaced by the D.C. component. In the case of the JPEG, for example, a code corresponding to "O" is given as mentioned above. The frequency component delete 19, on the basis of the information of FIG. 12B, converts the coefficient group of FIG. 12A into the coefficient group of FIG. 12C and outputs it onto a path 116.

Figure 12D:
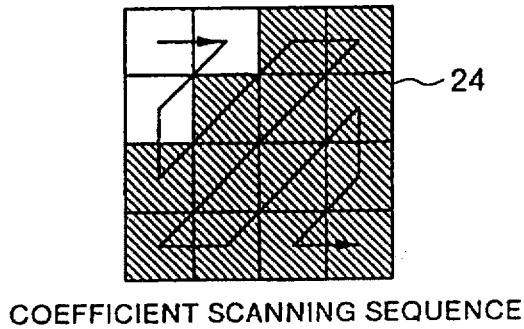
Figure 12E:
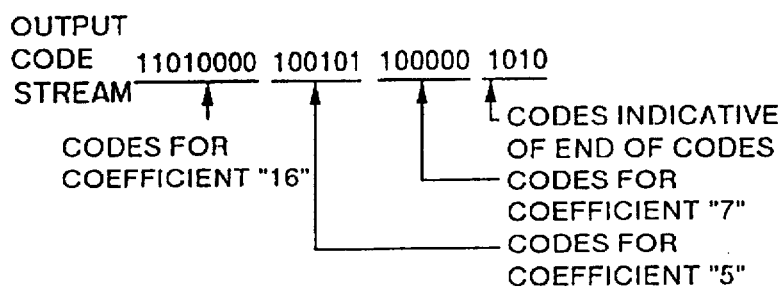

The variable-length coder 20 scans the coefficient group received from the path 116 in such a scanning order as shown in FIG. 12D, refers to such a coding table as shown in FIGS. 16 and 17 to obtain such a code stream as shown in FIG. 12E, subjects the code stream again to a variable-length coding to obtain variable-length codes, and then outputs the variable-length codes onto a path 117. When the variable-length coding table depends on information source, i.e., when it is necessary to modify the variable-length coding table at the time of coefficient deletion, the variable-length coder 20 can create such a variable-length coding table. The coding table used here may also be output together with the variable-length codes.

The buffer 21 re-creates the non-variable-length-code data received from the path 114 and the variable-length codes received from the path 117 into compressed image data of the sequential format. The buffer 21, as soon as it is put in its transmittable mode, can transmit the re-created data onto a path 103. When the data received from the path 114 corresponds to the pass-through compressed image data, the buffer 21 also passes the compressed image data therethrough without processing it and outputs it onto the path 103.

Figure 15:
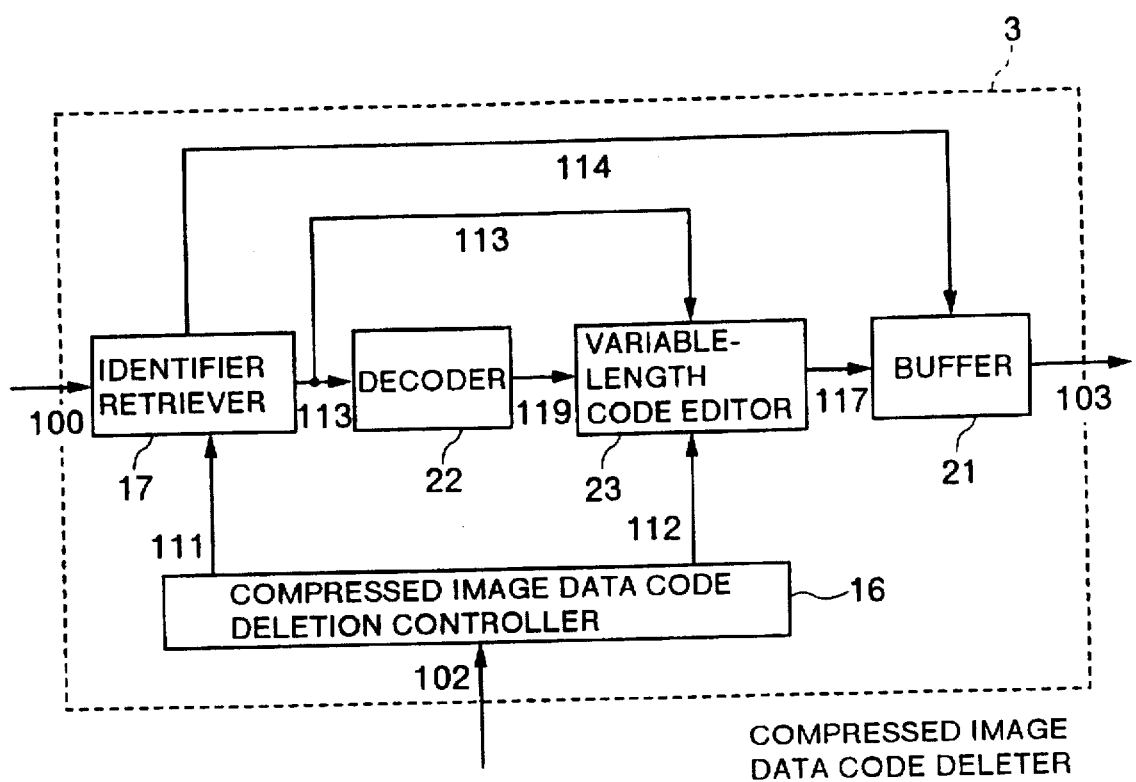
FIG. 15 shows an arrangement of a second compressed image data code deletion means for deleting desired frequency components from compressed image data in the present invention.

There is shown in FIG. 15 a second example of the arrangement of the compressed image data code deletion means 3 in accordance with the present invention, which includes a decoder 22 for decoding variable-length codes and a variable-length code editor 23. Other parts having the same reference numerals as those in FIG. 11 have the same functions. The decoder 22 is denoted by a different numeral from the decoder 18 of FIG. 11 because of its different operation from that of the decoder 18.

A difference of the system of FIG. 15 from that of FIG. 11 is that data once subjected to a variable-length code decoding is not suitably deleted for re-coding but only the bit positions of coded data of variable-length codes in the form of a continually arranged bits are decoded to directly edit the variable-length codes. This can be used when the variable-length coding table does not depend on information source or when excessive code editing is unnecessary. This is a control system effective, in particular, for a JPEG base line sequential system.

Figure 16B:
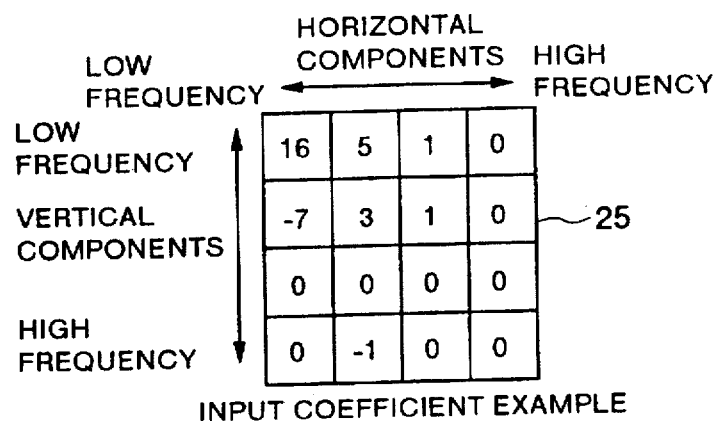

The decoder 22, on the basis of such information (for example, coding tables of FIGS. 16 and 14) necessary for decoding received from a path 113, decodes such variable-length codes as shown in FIG. 16A into such a block as shown in FIG. 16B and outputs to a path 119, whenever decoding one variable length code, data (frequency component) indicative of the code and such data as a code length indicative of the position of the associated variable-length code.

The variable-length code editor 23 collates such information of to-be-deleted frequency components received from a path 112 as shown in FIG. 16C with the coefficient group (see FIG. 16B) received from the path 119 and performs editing operation such as deletion, exchange, addition, etc. over variable-length codes of the data received from a path 113', an example of which editing operation will be explained later. The variable-length code editor 23 outputs the edited variable length codes (see FIG. 16D) onto a path 117.

The coding will be detailed in connection with a detailed example. In this case, assume now that input coefficients, after being subjected to the orthogonal transform and quantization and before being subjected to a variable-length coding, is expressed in the form of such a 4×4 matrix as shown in FIG. 17A. In this input coefficient example, the upper coefficients have lower frequencies, the upper leftmost coefficient is called a D.C. component, and the 15 coefficients other than the D.C. component coefficient are called A.C. components.

A variable-length coding used in this example is known as a Huffman coding. In the Huffman coding, shorter codes are sequentially assigned to coefficients having higher appearance probabilities for effective coding. The Huffman coding is carried out with use of such a Huffman coding table prepared based on probability as shown in FIGS. 13 and 14. The details of Huffman coding using such Huffman coding tables is described, e.g., in a magazine entitled "Interface", December, 1991, CQ Shuppan-sha, pp. 168–170. In this example, separate Huffman coding tables are provided for D.C. and A.C. components respectively. Further, in this example, group numbers are used for groups of coefficients divided according to the coefficient sizes (called grouping) in the Huffman coding (refer to FIG. 18). In the grouping according to the coefficient sizes, a minimum expressible bit number for the absolute values of coefficients of a group is set as a group number for the coefficients, additional bits for identifying each of the coefficients in the group are expressed by the same bit number as the group number. Scanning corresponding to the arrangement of the coefficients of this block is carried out in zigzag manner as the coefficient scanning order shown in FIG. 17B.

The Huffman coding will be explained in more detail in connection with FIGS. 17A to 17D. Although the example of Huffman tables of FIGS. 13, 14A and 14B is originally designed for a block of an 8×8 size, a block of a 4×4 size is employed here just for convenience of explanation. With respect to a difference of a D.C. component from a D.C. component of the previous block, a group number, a Huffman code and additional bits are assigned. With respect to an A.C. component, the number (run length) of zeroes until appearance of a non-zero coefficient during scanning, a Huffman code used for a group of non-zero coefficient group numbers, and additional bits for the Huffman code are assigned. The length of the additional bits is the same as the group number. And when there is no non-zero coefficient after a non-zero coefficient during the scanning, a code is assigned which is indicative of EOB (End Of Block) for this block. This Huffman coding is substantially the same as the JPEG base line sequential Huffman coding as an international standard, except that the block size is 8×8.

Such an input coefficient example as shown in FIG. 17A is subjected to a scanning operation in a coefficient scanning order such as shown in FIG. 17B, after which codes are assigned as in such a Huffman coding example shown in FIG. 17C. The Huffman coding example will be sequentially explained below.

The D.C. component coefficient is first scanned. Assuming that the D.C. component of the previous block is 10, then coefficients to be coded this time become 6 (16−10) because the D.C. component in this time is 16. Since the magnitude of 6 can be expressed in 3 bits, the group number becomes 3 (see FIG. 18), and the corresponding Huffman code is 100 (see FIG. 13). In this case, based on, e.g., the JPEG recommendation, the additional bits are set at 110. With respect to the D.C. component, even if a difference value from that of the previous block is zero, a Huffman code is given. Coefficients followed by the D.C. component coefficient are all A.C. components. The coefficient to be secondly coded has 5. Since this coefficient is an effective coefficient first appearing during the scanning of the A.C. components, the run length number is 0 and the group number is 3 (refer to FIG. 18). The Huffman code associated with the run length number of 0 and the group number of 3 is 100 (refer to FIG. 14). At this time, the corresponding additional bits are 101.

The subsequent Huffman code exemplary values are shown in the table of FIG. 17 as a result of referring to the Huffman tables of FIGS. 13 and 14 with respect to pairs of the run length numbers and group numbers for the other A.C. components. For example, a group number of 2 and a Huffman code of 11011 are given for a run length number of 1; a group number of 1 and a Huffman code of 00 are given for a run length number of 0; and a group number of 1 and a Huffman code of 1100 for a run length number of 1. Subsequently, the other A.C. components are similarly coded until the last effective coefficient is scanned, after which an EOB code is given. These arranged codes correspond to such an input code stream as shown in FIG. 17D. This stream is generated at the compressed image data output means 2 and then input to the sequential format type compressed image data code deletion means 3.

Detailed explanation will now be made as to code editing. The decoder 22 in FIG. 15 decodes the code stream received from the compressed image data output means 2 and outputs to the variable-length code editor 23 information indicative of the positions of the decoded Huffman codes and additional bits as well as the run length numbers. The word "information indicative of the positions" as used above may refer, for example, to the group numbers assigned to the decoded codes and to the lengths of the decoded codes. As already explained above, the group number indicates the length of the associated additional bits. When information such as a pointer indicative of the position of header of the codes to be previously decoded is previously prepared, the positions of the codes and overhead bits can be specified on the basis of the group numbers and the lengths of the additional bits. The variable-length code editor 23 performs its variable-length code editing operation on the basis of the position information and the to-be-deleted frequency component information (refer to FIG. 16C).

When the variable-length code editor 23 receives an example of the frequency components to be deleted such as shown in FIG. 16C, the editor deletes frequency components in the hatched area. That is, the information example of FIG. 16C means to delete coefficients following the coefficient of −7 in the scanning of FIG. 16B. Therefore, when a pointer 29 is placed behind the overhead bit of the Huffman code corresponding to the coefficient "−7" in the input code stream of FIG. 16A and a pointer 30 is placed ahead of the Huffman code of EOB (see FIG. 16D) and the codes placed between these pointers are deleted, such an output code stream (see FIG. 16E) is obtained. These pointers 29 and 30 can be easily generated from the position information.

Figure 16F:
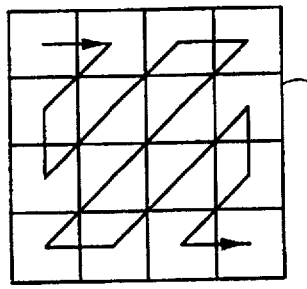
Figure 16G:
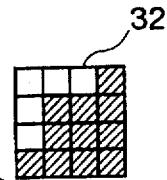

Meanwhile, when the information array of the to-be-deleted frequency components is as shown in FIG. 16G, since coefficients to be or not to be deleted in the scanning are mixedly present (in such a scanning order 24 as shown in FIG. 16F, since mere division between coefficients to be and not to be deleted cannot be easily done as in such a case that coefficients scanned until a specific coefficient are not deleted and coefficients scanned after the specific coefficient are deleted), the deletion causes variation of the run length. For this reason, re-assignment of the Huffman codes having the varied run lengths becomes necessary. In an input code stream of FIG. 16H, codes placed between the positions of pointers 33 and 34, which correspond to coefficients to be deleted, are deleted. The Huffman code between the positions of the pointers 34 and 35 must be re-assigned, since the previous coefficient was deleted. In the illustrated example, the Huffman code of 00 for the run length of 0 and the group number of 1 is changed to the Huffman code of 11100 for the run length of 2 and the group number of 1. And since the codes placed between the positions of pointers 36 and 37 correspond to coefficients to be deleted, the codes are deleted. Thus, a resultant output code stream is as shown in FIG. 16I.

When it is desired to delete the D.C. component, it will be appreciated that this can be realized by deleting the Huffman code and additional bits of the D.C. component and instead assigning thereto a Huffman code corresponding to a differential value of 0. Further, when it is desired to assign an intermediate value in a possible value range to the D.C. component, this can be realized by assigning a Huffman code and additional bits corresponding to the intermediate value to the D.C. component of a first difference-taken block and assigning a Huffman code corresponding to a differential value of 0 to the other blocks. When such code editing is collectively carried out any desired codes can be deleted.

When such code editing as mentioned above are carried out in combination, any desired editing can be realized, the compressed image data code delete can be implemented without involving re-coding, and thus a resultant system can be made simple in arrangement and high in processing speed. Although the above explanation has been made in connection with the Huffman code compliant with the JPEG as an example, the editing can be similarly realized even for a block code having an non-coded object and a code in a 1:1 relationship as in the Huffman code. In the case of the JPEG system, it is general that each block actually has a size of 8×8, the data amount to be deleted will be increased more than the above example case.

Explanation will next be made as to a third embodiment of the present invention for attaining the third object of the invention, by referring to FIG. 7 showing a picture file retrieval system based on a client server system. The word "browsing" as used herein means to look through a book while leafing the pages for the purpose of finding a target picture.

First, the client 42, on the basis of the retrieval information of compressed image data stored in an information memory medium 40 of the file server 39, determines a range thereof to be retrieved. The retrieval information of the compressed image data contains a file name, file header data and data stored in other retrieval information storage files. Thus, if the client knows the contents of a desired picture to some extent, then he or she can narrow its retrieval range down to some extent. The client determines the retrieval picture range and then the order of its display pictures. This may be determined in alphabetic order or in an arbitrary order. The retrieval and display are sequentially carried out in the determined order.

The client 42, which determined the retrieval range and order, outputs a compressed image data request signal demanding picture display to the file server 39 via a path 43. At the same time, a deletion information input means 47 of the client 42 issues a compressed image data deletion control signal to the compressed image data code deletion means 3 via a path 46. The compressed image data code deletion control signal contains information relating to the necessity or nonnecessity of parameters necessary for the decoding, the necessity or non-necessity of deletion of the compressed image data codes and also relating to frequency components to be deleted. The deletion information input means 47 will be explained later. The file server 39, in response to the compressed image data request signal, outputs the compressed image data to the compressed image data code deletion means 3 through a path 44. The compressed image data code deletion means 3, according to the compressed image data code deletion control signal, decreases the amount of the compressed image data and outputs the decreased data to the compressed image data reproduction means 1 of the client 42 through the path 45 as browsing compressed image data. The compressed image data display means 1 expands and displays thereon the browsing compressed image data. The user operates the deletion information input means 47 while looking at the browsing pictures for retrieval.

Figure 19:
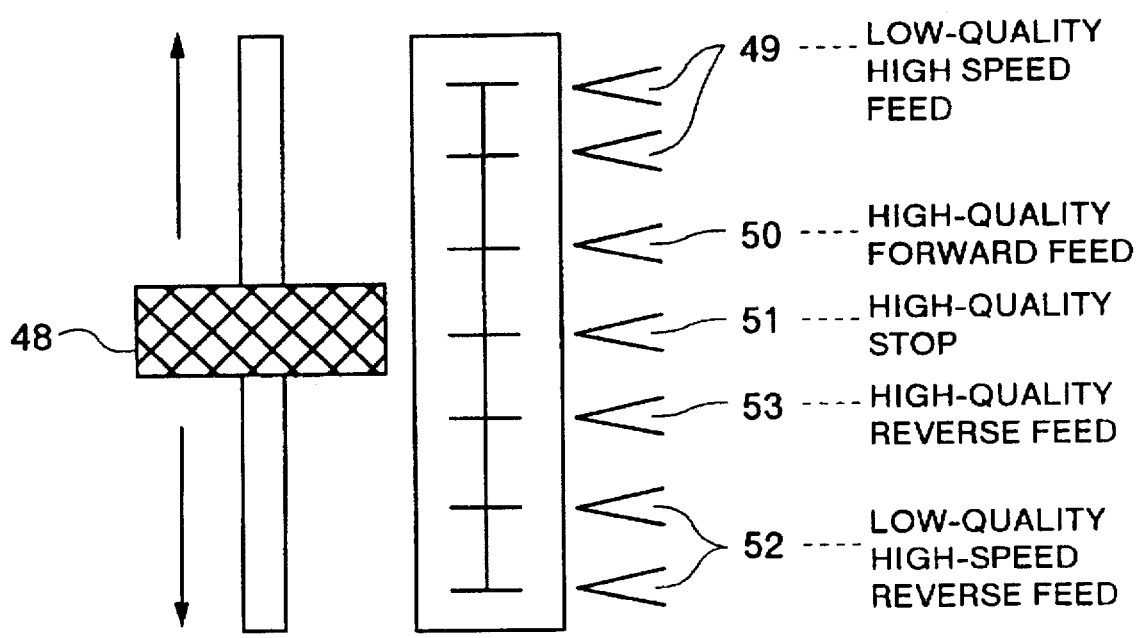
FIG. 19 shows an example of a throttle lever type interface of a deletion information input means in the present invention.

The deletion information input means 47 is a user interface which receives a sequential picture display speed (degree of roughness of the display picture) specified by the user. An example of such a user interface is shown in FIG. 19 as a throttle lever type interface. In the drawing, numeral 48 denotes a throttle lever, and numerals 49, 50, 51, 52 and 53 denote quality feed control for throttle lever 48. The throttle lever 48 may be structured mechanically or virtually on a display screen operated by a pointing device such as a mouse or by a keyboard. The throttle lever type interface has a similarity to a VTR jog shuttle, but is different therefrom in that frame decimation for rapid or reverse frame feed is carried out to control the display speed in the jog shuttle, whereas the amount of compressed image data is varied to control the display clearness to thereby provide quick display in the throttle lever type interface.

In the throttle lever 48 of FIG. 19, clear compressed image data is reproduced and stopped at the position 51. At the position 50, a high quality of pictures are sequentially displayed in a predetermined picture retrieval order. At the position 53, a high quality of pictures are reversely sequentially displayed. That is, issuance of the compressed image data request signal specifies non-performance of code deletion by the compressed image data code deletion control signal. At the positions 50 and 53, when the user releases the throttle lever 48, the lever automatically returns to the position 51 and a high quality of picture being displayed is displayed and stopped. In this connection, the word "release" as used above means, when the throttle lever is of a mechanical type, to literally set the user's finger off from the mechanical throttle lever, and when the throttle lever is of a virtual type, if means to set the user's finger free from a button of a mouse or the like.

At the position 49, a low quality of pictures are sequentially displayed in a predetermined sequence. At the position 52, low quality of pictures are sequentially displayed in reverse. That is, issuance of the compressed image data request signal means to specify frequency components to be subjected to a code deletion by the compressed image data code deletion control signal. In this case, the determination of the frequency components to be the code deletion may be carried out by referring to a predetermined table, depending on the position of the throttle lever 48 or by generating information on control of the to be deleted amount according to picture feature differences as in fussy control. While the compressed image data reproduction means 1 expands and displays the browsing compressed image data, the file server 39 can make preparations for the next browsing compressed image data to allow smooth browsing. At the positions 49 and 52, release of the throttle lever 48 causes the throttle lever 48 to automatically return to the position 51, resulting in a low quality picture being displayed is changed to a clear image which is displayed and then stopped. In the illustrated example, each of the low-quality rapid and reverse picture feed modes has two stages. However, the number of such stages may be set to be 1 or more than 2 to change the amount of frequency components to be deleted in various ways, whereby different positions can provide different browsing speeds. In the latter case, with respect to the same picture, the more the position of the throttle lever 48 is moved away from the position 51 the larger the code deletion amount is than the deletion amount at the current position.

Although the above explanation has been made in connection with the picture file retrieval system for retrieval of still pictures, the present invention may also be applied to motion pictures to transmit rough and smooth motion.

FIG. 8 shows a specific structure of the system of FIG. 7. Explanation will then be made as to the operation of a third embodiment of the present invention with reference to FIG. 8. The client 42 includes a CPU 60' and causes the virtual throttle lever 47 (see FIG. 7) to be displayed on the display 6 through a display interface 65 according to a program of a memory 61'. The client 42 reads the user's instruction through such a pointing device as a mouse (not shown in FIG. 8) and transmits a control value to the network 41 through a network interface 63' of the client 42.

The CPU 60 of the file server 39, in accordance with a request from the client 42, reads out a compressed image picture file from the hard drive 40 through the storage interface 62 and develops it on the memory 61. Previously loaded in the memory 61 is a program for realizing the function of the compressed image data code deletion means 3, so that code deletion is carried out according to the information of the throttle lever 47 of the client 42. Thereafter, the CPU 60 transmits suitably-code-deleted compressed image data to the network 41 via the network interface 63.

The CPU 60' of the client 42 reads, decodes and displays the compressed image data through the network interface 63'. The decoding may be implemented by means of a program of the CPU 60' or another processor or hardware.

Although explanation has been made in connection with the case where the compressed image data code deletion means 3 is implemented by the CPU 60 executing the program of the memory 61 in FIG. 8, this may be realized by means of hardware having the functions of FIGS. 11 and 15.

Similarly, though the throttle lever 47 is a virtual one displayed on the display 6 by the CPU 60' through the display interface 65 in FIG. 8, it goes without saying that the throttle lever 47 and display interface 65 may be replaced by physical ones.

Such differences in the implementing means as mentioned above can be readily thought of by those skilled in the art without departing from the subject 5 matter of the present invention.

Explanation will next be made as to a fourth embodiment of the present invention designed for motion pictures for attaining the fourth object of the invention, by referring to FIGS. 20A, 20B, 4, 5A, 5B and 21. More specifically, FIGS. 20A and 20B are diagrams for explaining an example of the format of compressed motion image data in accordance with the present invention, and FIG. 21 is an example of a communication flow of the compressed motion image data in the present invention.

Figure 20A:
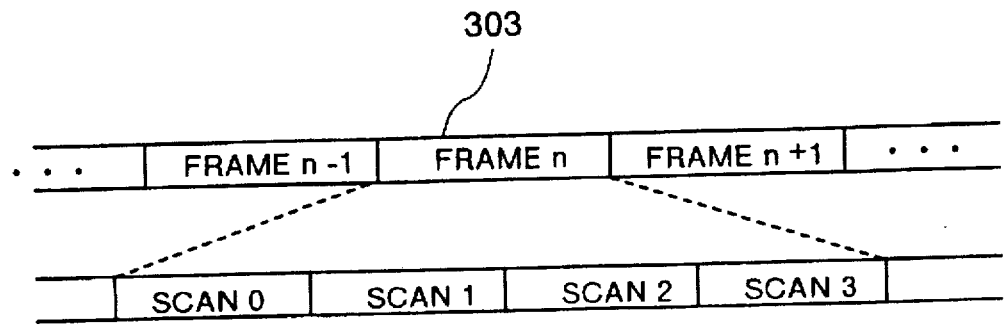
FIGS. 20A and 20B are diagrams for explaining compressed motion picture data in the present invention.
Figure 20B:
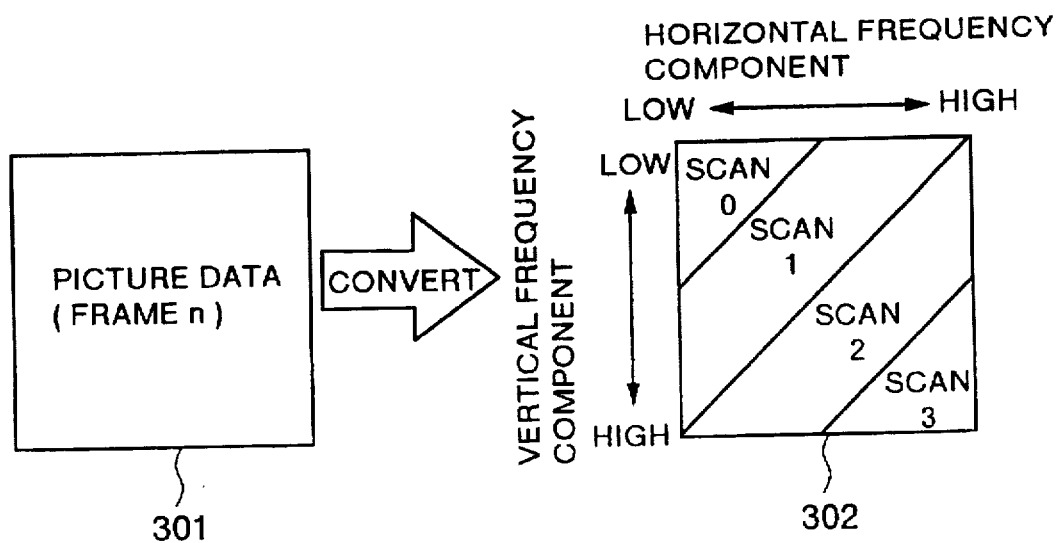

In FIGS. 20A and 20B, reference numeral 301 denotes picture data having a frame number (No.) n in a motion picture stream, 302 denotes data obtained after the picture data 301 is subjected to a conversion of two-dimensional frequency components, and 303 denotes a motion picture stream data. The conversion of the picture data 301 to the spatial frequency data 302 may be carried out, for example, by such orthogonal transforming as DCT (Discrete Cosine Transform) as used in the JPEG as an international standard system of still picture compression. The spatial frequency data 302 is divided into a plurality of compressed sub-data by a plurality of scans directed from its low frequency component to its high frequency component, and the plurality of sub-data are stored as a plurality of compressed frame data. This is a case where a mode called the progressive mode in the specifications of the above JPEG is expanded to application for motion pictures. Though the number of scans has been set at 4 in the present embodiment, the scan number may be increased as necessary. In addition, reference is not made to an inter-frame difference often used in the motion picture compression of the H. 261, MPEG or the like in the present embodiment, but the above scan data may be handled as differential data.

Figure 4:
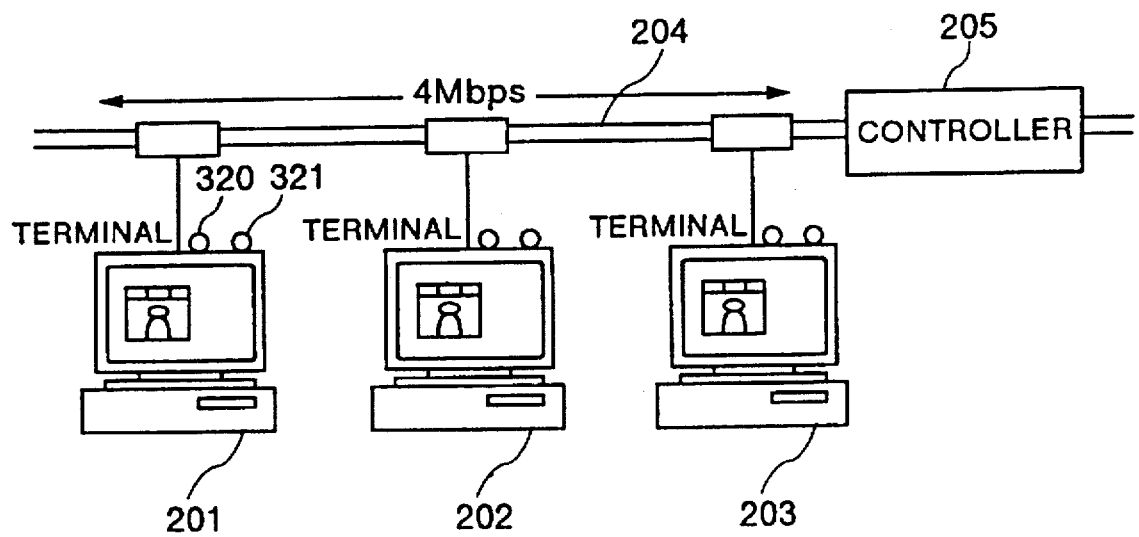
FIG. 4 shows an example of motion picture communication devices connected in a TDM system.
Figure 5A:
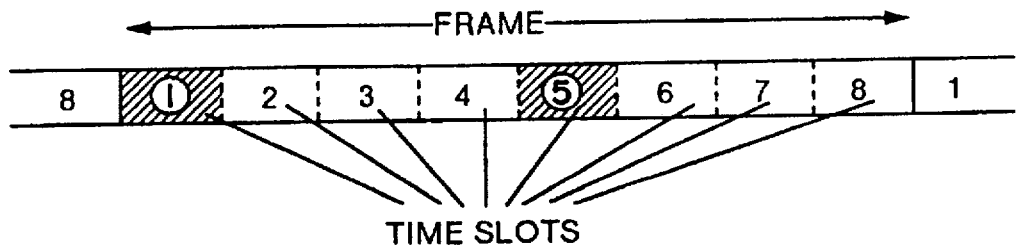
FIGS. 5A and 5B are diagrams for an example of how to assign time slots to terminals in the TDM system.
Figure 5B:
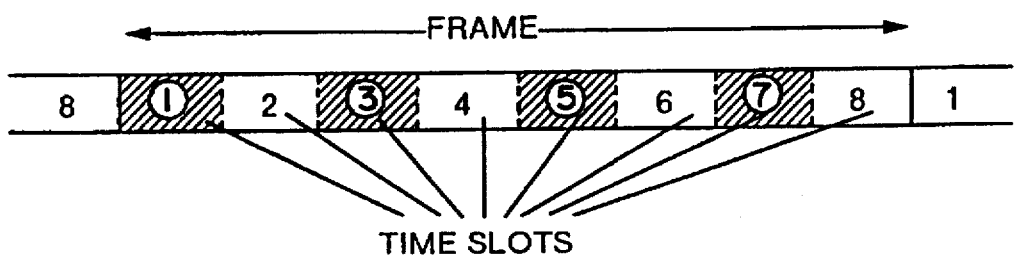

Next, explanation will be made as to a case where the compressed motion picture of the data format shown in FIGS. 20A and 20B is communicated with use of such a system configuration as shown in FIG. 4. As shown in FIG. 5B, it is possible to communicate the motion picture data compressed based on the MPEG only when the system is not stationary but demand assign type TDM system. However, when 3 of the terminals 201 to 203 try to transmit their motion picture data simultaneously, this causes shortage of time slots per terminal, and as a result it becomes necessary to reduce the amount of motion picture data per unit time in some manner. This will be detailed by referring to the communication flow of FIG. 21.

Figure 21:
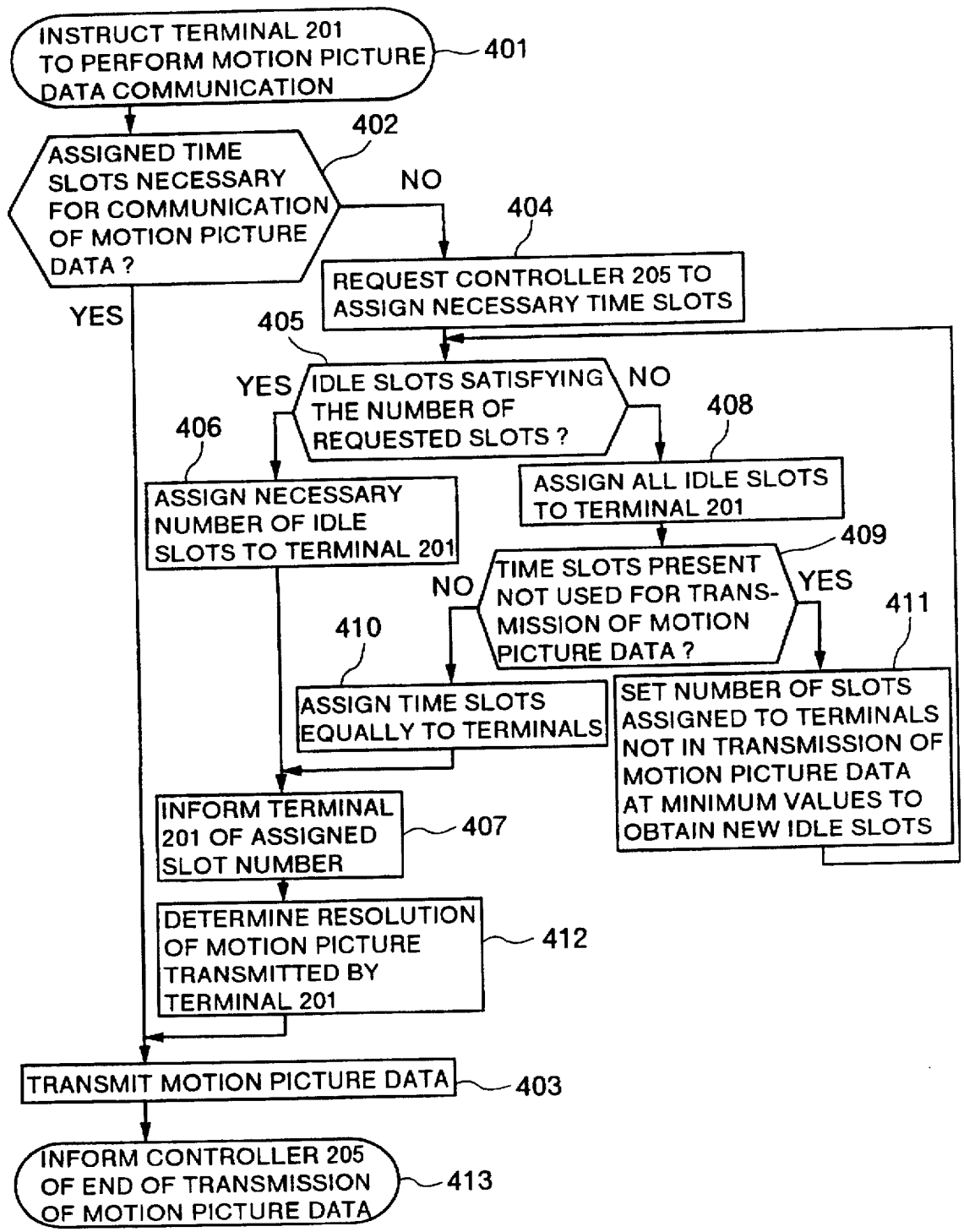
FIG. 21 shows an example of communication flow of compressed motion picture data in the present invention.

Consider in the flow of FIG. 21 such a case that the terminal 201 in FIG. 4 transmits motion picture data. First of all, the operator gives an instruction indicative of motion picture data communication to the terminal 201 (step 401). Terminal 201 judges whether or not time slots necessary for transmission of the motion picture data are already assigned to the terminals (step 402). Since the respective terminals occupy their time slots while transferring data with the controller 205 and thus know the number of their occupied time slots, the terminals can always make such judgement. If the necessary time slots are assigned to the terminal 201, then the terminal starts its transmission of the motion picture data (step 403); otherwise, the terminal requests the controller 205 to assign the necessary time slot number thereto (step 404).

The controller 205 judges the presence or absence of idle slots satisfying the requested time slot number (step 405). In the presence of such idle slots, the controller 205 assigns a necessary number of idle slots to the terminal 201 (step 406), and informs the terminal 201 of the assigned slot number to give permission of the motion picture communication (step 407). If not, then the controller 205 assigns all of the idle slots to the terminal 201 (step 408), and judges the presence or absence of time slots not used for the transmission of the motion picture data (step 409).

In the absence of such time slots, the controller 205 equally assigns time slots to the respective terminals (step 410); otherwise the controller sets the number of slots assigned to the terminal not transmitting any motion picture data at its predetermined minimum value to create a new idle slot, and again performs the judgement of the step 405 (step 411).

The above operation is repeated so that the controller determines the number of slots to be assigned to the terminal 201 and then determines the resolution of a motion picture to be transmitted by the terminal 201 (step 412). After the terminal 201 transmits the motion picture data (step 403) and completes its transmitting operation, the terminal informs the controller 205 of the effect (step 413). This is because the controller 205 is required to identify slots being used for the transmission of the motion picture data for performing the judgement of the step 409.

Explanation has been made in connection with the case where the present embodiment employs the TDM system. Apart from it, the concept of time slots does not exist in the CSMA/CD system most often used in the LAN, but this can be realized by using the network monitoring function instead. The latter will be explained later as a fifth embodiment. The word "monitoring function refers to a function of checking the traffic of the network. In this case, each of terminals holds a table showing a relationship between the traffic of the network and the available band width of the network, computes a band width of the network available for the communication of motion picture data of the terminal in question on the basis of a measured traffic, and decides a spatial frequency region of the motion picture to be transmitted. It goes without saying that the spatial frequency region can be obtained not by computing it on the basis of the table held in each terminal showing the relationship between the traffic of the network and the available band width of the network but rather by computing it by utilizing such a technique as a fussy control.

Figure 22:
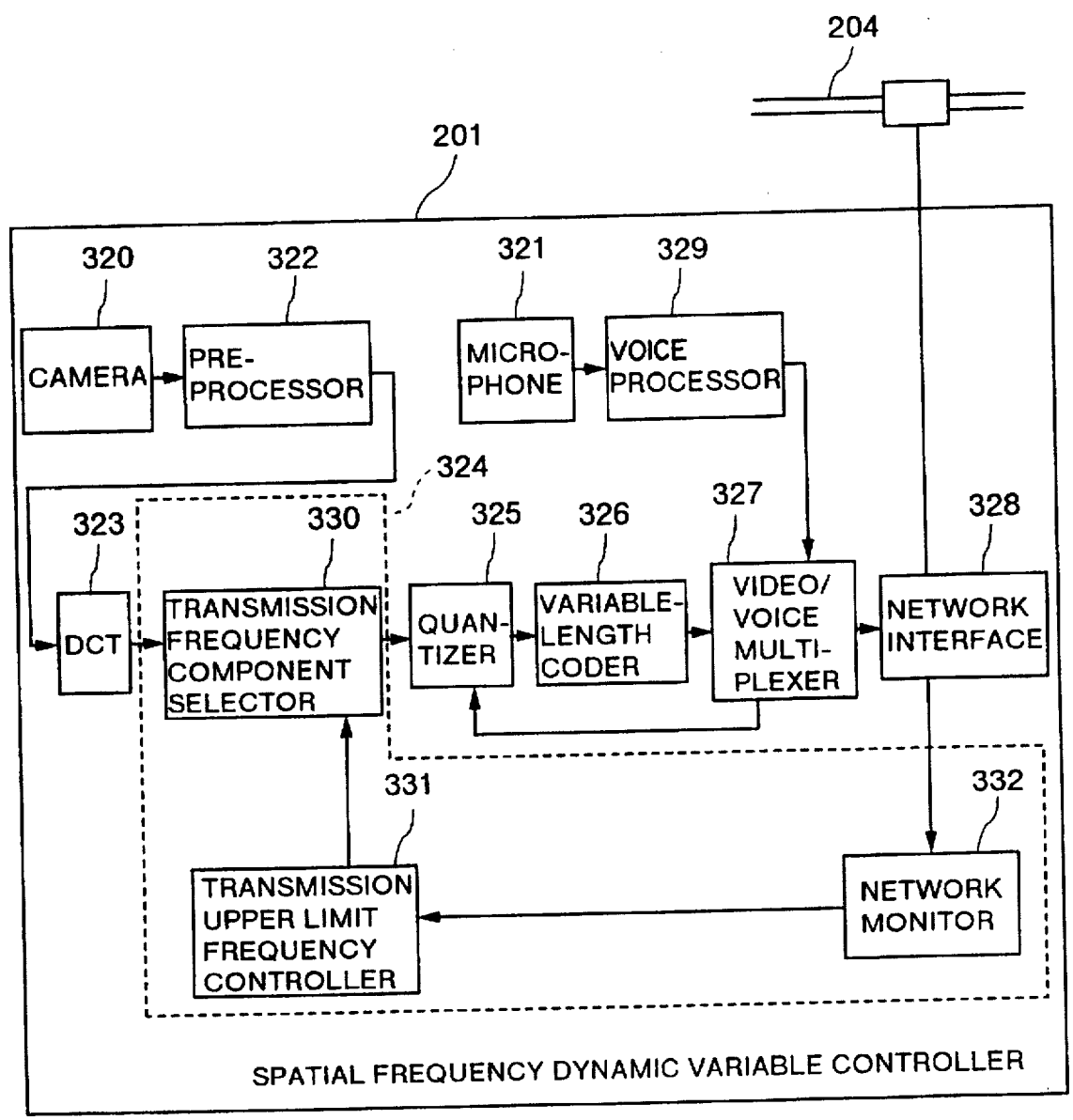
FIG. 22 shows an arrangement of a real-time motion picture communication transmitter.

A fifth embodiment of the present invention will be explained by referring to FIG. 22 showing a structure of a transmitter of a real time motion picture communication system. The present embodiment can be applied to a CSMA/CD system other than the aforementioned TDM system. In FIG. 22, numeral 201 denotes a terminal and numeral 204 denotes a network. The terminal 201 includes a camera 320 for input of motion picture, a pre-processor 322 for digitizing or refiltering a signal received from the camera 320 or matching it with the pixel format of a bit map, a discrete cosine transform (DCT) means 323, a spatial frequency dynamic variable controller 324, a quantizer 325, a variable-length coder 326 for carrying out Huffman coding or arithmetic coding operation, a microphone 321 for input of such an audio signal as a voice signal, a voice processor 329 for digitizing or compressing-the audio signal, a video/voice multiplexer 327 for mixing the digitized/compressed video and voice signals, a network interface 328 with the network 204, a network monitor 332 for detecting a traffic state of the network, a transmission upper limit frequency controller 331 for varying the upper limit frequency of a video signal to be transmitted in accordance with a result monitored by the network monitor 332, a transmission frequency component selector 330 for selecting frequency; components between a predetermined lower limit frequency of the video signal and the upper limit frequency the video signal dynamically set by the transmission upper limit frequency controller 331 and for transmitting the selected frequency components to the quantizer 325.

In operation, the camera 320 and pre-processor 322 digitizes a motion picture to convert it to bit map data. Next, the DCT 323 converts the bit map data to components of spatial frequency regions. More specifically, for example, the DCT 323 divides the received video bit map data into small blocks of 8×8 pixels and converts the data to frequency component data corresponding to the respective small blocks. In this case, the lowest-frequency component is called D.C. component indicative of average color data of the small blocks. Data having the higher frequency components indicates the finer part of the small blocks. Such a conversion is called an orthogonal transform, among which the DCT is a representative conversion system. For this reason, the DCT system is employed in the present embodiment. Of course, another orthogonal transform including a KL (Karhunen-Loeve) transform may be employed. The picture data converted to the spatial frequency components are usually re-arranged in an order of from lower frequency component to higher frequency component by a method called a zigzag scan. In the present embodiment, the zigzag scan is carried out in the DCT 323. In a conventional system, data is subjected to the zigzag scan to be re-arranged in an order of from lower frequency component to higher frequency component, and the re-arranged data are applied directly to the quantizer 325. The quantizer 325 performs its quantizing operation over the received data by dividing the respective data by basis numbers corresponding to the respective frequency components. The larger the quantization basis number is made, the larger the quantizing step size becomes and the larger the compression ratio becomes. The thus quantized data are converted at the variable-length coder 326 to variable-length code codes. Typical coding systems include a Huffman coding system or an arithmetic coding system such as those mentioned above. The coder 326 compresses the data by assigning a shorter code to data having a higher incidence probability of the bit train pattern of the data. With regard to voice data, data received through the microphone 321 is digitized and compressed at the voice processor 329. The next video/voice multiplexer 327 combines the compressed video data received from the variable-length code coder 326 and the compressed voice data received from the voice processor 329 on a time division multiplex basis to form video/voice data. The video/voice data is attached at the network interface 328 with a signal format and protocol suitable for the network 204, and then connected to the network 204.

In a conventional system, the video/voice multiplexer 327 has controlled the amount of data applied to the network interface 328 to be constant, by controlling the quantizing step size of the quantizer 325 to be variable while checking the amount of the video data stored in a buffer memory provided at the input part of the multiplexer 327. However, such control with modification of the quantizing table not only increases a modifying operation such as transmission of a new table, but this also is an indirect control method of modifying the quantizing step size, which results in that control of increasing or decreasing the amount of data as desired cannot be realized. In accordance with the present invention, for the purpose of realizing variable control over the data amount directly and effectively, the spatial frequency dynamic variable controller 324 is provided. In this controller 324, the network monitor 332 detects the traffic state of the network 204, the transmission upper limit frequency controller 331 judges to what high frequency components the transmission to be done, and the transmission frequency component selector 330, on the basis of a judgement result of the transmission upper limit frequency controller 331, sets that part of the data other than data in a frequency range to be transmitted to be zero to perform processing after the quantization stage. In the DCT 323, the input data is converted to 64 frequency components except for the aforementioned D.C. component, so that, when it is desired to delete all the 63 data other than the D.C. component as an extreme case, remarkable data amount adjustment can be indirectly carried out. As a result, the resultant picture has a blurred part of a substantially dropped resolution corresponding to the deletion of high frequency components, but the number of display frames per unit time as the target of the present invention can be maintained.

As has been disclosed in the foregoing, when the compressed image data code deletion system and means of the present invention are employed, the amount of codes in the compressed image data of the sequential format can be reduced without modifying the existing system to a large extent, the data transmission time and compressed image data decoding time can be shortened with an increased operating efficiency.

Further, in accordance with the present invention, while motion picture communication is being effected with use of a network having a dynamically varying available band width, when the network lacks the band width, the system of the present invention does not decrease the frame rate of the motion picture but transmits data subjected to deletion of high frequency components of the spatial frequencies of the picture, whereby the system can maintain the motion picture communication without missing some of the motion information of the picture. As a result, even when the present invention is applied to such a case that motion transmission is important, the motion picture communication can be realized with use of a network having a dynamically varying available band width.

What is claimed is:

1. A method for creating compressed image data, said method comprising the steps of:
   reading out compressed image data of a desired picture from a memory having compressed image data of a sequential format stored therein, said image data of the sequential format having been compressed by using at least an orthagonal transform and Huffman coding;
   examining a plurality of frequency components of said read-out compressed image data;
   deleting part of said plurality of frequency components without altering the size of the coded image data; and
   obtaining compressed image data of a quality lower than an original quality of said compressed image data.

2. A device for creating compressed image data as set forth in claim 1, wherein at least a D.C. component of said read-out compressed image data remains after said step of deleting part of said frequency components.

3. A device for creating compressed image data, comprising:
   means for reading out compressed image data of a desired picture from a memory having compressed image data of a sequential format stored therein, said image data of the sequential format having been compressed by using at least an orthagonal transform and Huffman coding;
   means for examining a plurality of frequency components of said read-out compressed image data;
   means for deleting part of said plurality of frequency components by directly editing the Huffman coding without altering the size of the coded image data; and
   means for obtaining compressed image data of a quality lower than an original quality of said compressed image data by utilizing the frequency components other than said deleted frequency components.

4. A device for creating compressed image data as set forth in claim 3, wherein at least a D.C. component of said read-out compressed image data is left in said frequency component deletion means.

5. A method for displaying compressed image data, said method comprising the steps of:
   reading out compressed image data of a desired picture from a memory having compressed image data of a sequential format stored therein, said image data of the sequential format having been compressed by using at least an orthagonal transform and Huffman coding;

examining a plurality of frequency components of said read-out compressed image data;

deleting part of said plurality of frequency components by directly editing the Huffman coding without altering the size of the coded image data in a stepwise manner according to a specified picture quality to obtain compressed image data of the sequential format of a quality lower than an original quality of said compressed image data;

decoding said compressed image data of the lower quality with use of a decoder; and displaying said decoded picture of the lower quality on display means.

6. A method for displaying compressed image data as set forth in claim 5, wherein at least a D.C. component of said read-out compressed image data is left in said frequency component deletion step.

7. A device for displaying compressed image data, comprising:

means for reading out compressed image data of a desired picture from a memory having compressed image data of a sequential format stored therein, said image data of the sequential format having been compressed by using at least an orthagonal transform and Huffman coding;

means for examining a plurality of frequency components of said read-out compressed image data;

means for deleting part of said plurality of frequency components by directly editing the Huffman coding without altering the size of the coded image data in a stepwise manner according to the specified picture quality to obtain compressed image data of the sequential format of a quality lower than an original quality of said compressed image data;

a decoder for decoding said compressed image data of the lower quality; and display means for displaying thereon said decoded picture of the lower quality.

8. A device for displaying compressed image data as set forth in claim 7, wherein at least a D.C. component of said read-out compressed image data is left in said frequency component deletion means.

* * * * *